(12) United States Patent
Kati et al.

(10) Patent No.: US 12,703,250 B2
(45) Date of Patent: Aug. 11, 2026

(54) DISTRIBUTED AND GENERIC CONTROL ALLOCATION FOR MULTI-UNIT VEHICLE COMBINATIONS

(71) Applicant: Volvo Truck Corporation, Gothenburg (SE)

(72) Inventors: Maliheh Sadeghi Kati, Öjersjö (SE); Mats Jonasson, Partille (SE); Jonas Fredriksson, Mölndal (SE); Leo Laine, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 59 days.

(21) Appl. No.: 18/870,841

(22) PCT Filed: Jun. 7, 2022

(86) PCT No.: PCT/EP2022/065415
§ 371 (c)(1),
(2) Date: Dec. 2, 2024

(87) PCT Pub. No.: WO2023/237184
PCT Pub. Date: Dec. 14, 2023

(65) Prior Publication Data

US 2025/0326449 A1 Oct. 23, 2025

(51) Int. Cl.
*B60L 15/20* (2006.01)
*B60W 10/26* (2006.01)
(Continued)

(52) U.S. Cl.
CPC ......... *B60L 15/2045* (2013.01); *B60W 10/26* (2013.01); *B60W 30/045* (2013.01);
(Continued)

(58) Field of Classification Search
CPC .. B60L 15/2045; B60L 15/2036; B60L 15/38; B60L 2240/12; B60L 2240/16;
(Continued)

(56) References Cited

U.S. PATENT DOCUMENTS

2012/0197469 A1 8/2012 Ghoneim et al.
2019/0202546 A1 7/2019 Mahboubi et al.
(Continued)

FOREIGN PATENT DOCUMENTS

CN 105867168 A 8/2016
EP 4653276 A1 * 11/2025 .............. B60L 15/20
(Continued)

OTHER PUBLICATIONS

International Search Report and Written Opinion for International Patent Application No. PCT/EP2022065415, mailed Jan. 27, 2023, 38 pages.

(Continued)

*Primary Examiner* — Hai H Huynh
(74) *Attorney, Agent, or Firm* — Withrow & Terranova, PLLC

(57) ABSTRACT

A method of distributed control allocation in a vehicle combination including multiple vehicle units is provided, in which a master control allocator solves a combination-specific control allocation problem to perform control allocation on a combination level, and each of a plurality of slave control allocators receives unit-specific virtual control inputs from the master control allocator and then performs control allocation on vehicle unit level to control actuators of an associated vehicle unit. A method performed in a master control allocator, a method performed in a slave control allocator, a distributed control allocation system, a master control allocator, a slave control allocator, a vehicle
(Continued)

combination, a vehicle unit, and computer programs and computer program products are also provided.

20 Claims, 6 Drawing Sheets

(51) Int. Cl.

| | |
|---|---|
| ***B60W 30/045*** | (2012.01) |
| ***B60W 30/188*** | (2012.01) |
| ***B60W 40/10*** | (2012.01) |
| ***B62D 53/00*** | (2006.01) |
| *B60W 10/08* | (2006.01) |
| *B60W 10/20* | (2006.01) |

(52) U.S. Cl.

CPC .......... *B60W 30/188* (2013.01); *B60W 40/10* (2013.01); *B62D 53/005* (2013.01); *B60L 2240/12* (2013.01); *B60L 2240/16* (2013.01); *B60L 2240/22* (2013.01); *B60L 2240/54* (2013.01); *B60W 10/08* (2013.01); *B60W 10/20* (2013.01); *B60W 2300/14* (2013.01); *B60W 2300/147* (2024.01); *B60W 2510/08* (2013.01); *B60W 2510/18* (2013.01); *B60W 2510/20* (2013.01); *B60W 2510/244* (2013.01); *B60W 2510/248* (2013.01); *B60W 2520/10* (2013.01); *B60W 2520/105* (2013.01); *B60W 2520/12* (2013.01); *B60W 2520/14* (2013.01); *B60W 2520/22* (2013.01); *B60W 2556/65* (2020.02); *B60W 2710/083* (2013.01); *B60W 2710/202* (2013.01)

(58) Field of Classification Search

CPC ............. B60L 2240/22; B60L 2240/54; B60L 2200/36; B60L 2260/44; B60W 10/26; B60W 10/20; B60W 10/08; B60W 10/184; B60W 30/045; B60W 30/188; B60W 30/02; B60W 40/10; B60W 2300/14; B60W 2300/147; B60W 2510/08; B60W 2510/18; B60W 2510/20; B60W 2510/244; B60W 2510/248; B60W 2520/10; B60W 2520/105; B60W 2520/12; B60W 2520/14; B60W 2520/22; B60W 2556/65; B60W 2710/083; B60W 2710/202; B60W 2710/207; B60W 2050/0031; B60W 2050/0006; B60W 2720/10; B60W 2720/106; B60W 2720/12; B60W 2720/14; B60W 50/06; B62D 53/005; B60T 7/20; B60T 8/1708; B60Y 2200/147

USPC ......................................... 701/41, 42, 43, 44

See application file for complete search history.

(56) References Cited

U.S. PATENT DOCUMENTS

| | | | | |
|---|---|---|---|---|
| 2021/0291801 | A1 | 9/2021 | Westerhof et al. | |
| 2022/0063575 | A1 | 3/2022 | Laine et al. | |
| 2025/0313094 | A1 * | 10/2025 | Sadeghi Kati | B60L 15/2036 |

FOREIGN PATENT DOCUMENTS

| | | | | |
|---|---|---|---|---|
| WO | 2021160253 | A1 | 8/2021 | |
| WO | 2021173942 | A1 | 9/2021 | |
| WO | WO-2025016526 | A1 * | 1/2025 | B60W 10/20 |

OTHER PUBLICATIONS

International Preliminary Report on Patentability for International Patent Application No. PCT/EP2022065415, mailed Dec. 7, 2023, 31 pages.

* cited by examiner

DISTRIBUTED AND GENERIC CONTROL ALLOCATION FOR MULTI-UNIT VEHICLE COMBINATIONS

This application is a 35 USC 371 national phase filing of International Application No. PCT/EP2022/065415, filed Jun. 7, 2022, the disclosure of which is incorporated herein by reference in its entirety.

TECHNICAL FIELD

The present disclosure relates to the field of control allocation for multi-unit vehicle combinations. In particular, the present disclosure relates to control allocation distributed on both vehicle combination-level and vehicle unit-level.

BACKGROUND

A heavy vehicle combination usually includes a towing unit (such as a truck or a tractor) and one or more towed units (trailers), all connected in series using suitable couplings. With the advance of battery and electric motor technology in particular, it is often envisaged that not only the towing unit, but also the various towed units, may be equipped with actuators capable of generating e.g. braking and/or propulsion forces. For example, a trailer may be equipped with one or more electric machines in order to propel the wheel units of the trailer. In more advanced such configurations, each wheel unit of a trailer may be propelled independently of the other wheel units, if for example providing a separate electric machine/motor for each wheel unit. Some or all wheels of the trailer may also be steerable, in order to provide a better ability of the vehicle combination to drive through e.g. tight corners or similar.

As the vehicle combinations so become more and more complex, the increasing number of controllable degrees of freedom makes it challenging to control the vehicle combination as a whole. In particular, as the number of controllable degrees of freedom starts to exceed the number of desired forces and moments of the vehicle combination as a whole, the vehicle combination becomes over-actuated and the problem of control becomes underdetermined. As a result, there can be multiple possible solutions for how to control the various actuators such that they together generate the desired overall forces and moments.

So-called control allocation is often used to address this problem, wherein a control allocator receives desired forces and moments for the vehicle combination as a whole (a so-called virtual control input), and attempts to solve an optimization problem in order to find an optimal solution for how the actuators should be controlled (a so-called true control input).

Conventional such control allocators are often responsible for directly controlling the actuators in all vehicle units, and are (due to the complexity of the problem they are supposed to solve) often tailored specifically to a particular configuration of the vehicle combination. If the configuration of the vehicle combination was to change, e.g. by adding or removing one or more trailers, and/or by adding or removing actuators to one or more trailers, the conventional control allocator has to be re-developed in order to adapt to the new situation.

SUMMARY

Based on the above, there is therefore a need for a more flexible way of performing control allocation in multi-unit vehicle combinations.

To at least partially satisfy such an identified need, the present disclosure provides a (computer-implemented) method of distributed control allocation in a vehicle combination including a plurality of vehicle units, corresponding methods performed in a master control allocator and slave control allocator, a distributed control allocation system, a master control allocator, a slave control allocator, a vehicle combination, a vehicle unit, and corresponding computer programs and computer program products as defined by the accompanying independent claims. Various embodiments of the various methods, control allocation system, master and slave control allocators, vehicle combination, vehicle unit, and computer programs and computer program products are defined by the accompanying dependent claims.

According to a first aspect of the present disclosure, a method of distributed control allocation in a vehicle combination is provided, wherein the vehicle combination is assumed to include a plurality of vehicle units, where each vehicle unit includes one or more wheel units and one or more actuators configured to provide torque and/or steering for the one or more wheel units. The method includes receiving a vehicle combination-specific virtual control input for the vehicle combination as a whole; in a master control allocator associated with the vehicle combination as a whole, calculating a vehicle unit-specific virtual control input for each vehicle unit based on the received vehicle combination-specific virtual control input, by attempting to solve a vehicle combination-specific control allocation problem; and, in each of a plurality of slave control allocators each associated with a respective vehicle unit: receiving the vehicle unit-specific virtual control input for the vehicle unit; calculating a vehicle unit-specific true control input for the vehicle unit based on the vehicle unit-specific virtual control input, by attempting to solve a vehicle unit-specific control allocation problem, and controlling the one or more actuators of the vehicle unit associated with the slave control allocator based on the calculated unit-specific true control input.

As used herein, a "vehicle combination" may e.g. be a heavy vehicle combination, such as e.g. a utility vehicle combination. A vehicle combination may e.g. include a towing unit (tractor unit or truck) and one or more towed units (such as one or more trailers). Other vehicle combinations are also envisaged, including e.g. also combinations including one or more dollies or similar. A "master control allocator" may also be referred to as e.g. a "main control allocator", a "primary control allocator", a "control allocator on the vehicle combination level", "a vehicle combination control allocator", or similar. Likewise, a "slave control allocator" may also be referred to as e.g. a "subsidiary control allocator", a "secondary control allocator", a "control allocator on the vehicle unit level", a "vehicle unit control allocator" or similar. As the true control inputs calculated by the master control allocator are vehicle unit-specific, each slave control allocator only needs to receive virtual control input information specific for its associated vehicle unit, and does therefore not need to be concerned with any virtual control input information provided to other slave control allocators and vehicle units. Preferably, each slave control allocator physically forms part of its associated vehicle unit, while the main control allocator may physically form part of any of the vehicle units, preferably a towing vehicle unit such as a truck or tractor. It is, however, also envisaged that one or more of the slave control allocators may physically form part of a same unit which is located in one of the vehicle units, and that such a combined unit is able to communicate with the actuators of the multiple vehicle units which it is then to control. In other embodiments, the main control allocator may physically form part of a same unit as one of the slave control allocators. For example, the main control allocator and the slave control allocator of e.g. the towing unit may be a same unit. In yet other embodiments, one or more of the control allocators (main and/or slaves) may not be physical units themselves, but rather be implemented in software as part of e.g. a control allocation computer program running on one or more physical devices of one or more of the various vehicle units.

The envisaged method of the present disclosure improves upon common available technology in that it does not use the master controller to specifically control each individual actuator in the various vehicle units, but instead divides the problem of control allocation into two levels (vehicle combination-specific and vehicle unit-specific levels), and solves different control allocation problems for each such level. By performing the control allocation in two stages (first for the vehicle combination as a whole, and then separately for each vehicle unit), the master control allocator does not need to be aware of how exactly each vehicle unit is configured in terms of e.g. actuators. Consequently, the master control allocator does not need to be re-developed each time a configuration of e.g. a trailer changes, and/or each time a trailer is added to, or removed from, the vehicle combination, which makes the master control allocator more generic than its conventional counterpart.

In some embodiments of the method, the method may further include the master control allocator receiving vehicle unit-specific force- and/or moment-limitations for the vehicle units, and the master control allocator using the received vehicle unit-specific force- and/or moment-limitations for the vehicle units as input to the vehicle combination-specific control allocation problem.

In some embodiments of the method, the method may further include each slave control allocator receiving actuator-limitations of the one or more actuators of the vehicle unit associated with the slave control allocator, and each slave control allocator using the received actuator-limitations as input to the vehicle unit-specific control allocation problem.

In some embodiments of the method, the method may further include each slave control allocator calculating the vehicle unit-specific force- and/or moment-limitations of the vehicle unit (associated with the slave control allocator) based on the received actuator-limitations of the one or more actuators of the vehicle unit, and the master control allocator receiving the vehicle unit-specific force- and/or moment-limitations for the vehicle units from the slave control allocators (i.e., that each slave control allocator calculates and sends the force- and/or moment limitations for its associated vehicle unit to the master control allocator).

In some embodiments of the method, the actuator-limitations may include limitations on torque and/or steering angles producible/providable by the one or more actuators (of the associated vehicle unit).

In some embodiments of the method, the one or more actuators (of at least one of the vehicle units) may include at least one of an electric machine (for propelling and/or braking the vehicle unit), a service brake (for braking the vehicle unit), and/or a steering servo arrangement (for changing a steering angle of a wheel unit of the vehicle unit). As used herein, an "electric machine" is any device capable of converting electric power into mechanical power, e.g. an electric motor or similar. It is also envisaged that an electric machine may include a device also, or instead, capable of converting mechanical power into electric power, e.g. in an electric motor operable as a generator and configured to for example regeneratively brake the vehicle unit.

According to a second aspect of the present disclosure, a method performed in a master control allocator of a distributed control allocation system of a vehicle combination is provided. As above, it is assumed that the vehicle combination includes a plurality of vehicle units, and that each vehicle unit includes one or more wheel units and one or more actuators configured to provide torque and/or steering for the one or more wheel units. Further, it is assumed that the master controller is communicatively connected to a plurality of slave control allocators each associated with a respective vehicle unit. The method includes: receiving a vehicle combination-specific virtual control input for the vehicle combination as a whole; calculating a vehicle unit-specific virtual control input for each slave control allocator currently connected to the master control allocator and based on the received vehicle combination-specific virtual control input, by attempting to solve a vehicle combination-specific control allocation problem, and sending the calculated vehicle unit-specific virtual control inputs to the respective one or more slave control allocators connected to the master control allocator.

In some embodiments of the method, the method may further include receiving vehicle unit-specific force- and/or moment-limitations, and using the received vehicle unit-specific force- and/or moment-limitations as input to the vehicle combination-specific control allocation problem.

In some embodiments of the method, the method may further include receiving the force- and/or moment-limitations of the vehicle units from the one or more slave control allocators connected to the master control allocator.

The method of the second aspect may thus correspond to the steps performed by the master control allocator in the method of the first aspect (or any embodiment thereof as disclosed herein).

According to a third aspect of the present disclosure, a method performed in a slave control allocator of a distributed control allocation system of a vehicle combination is provided. It is assumed that the vehicle combination includes a vehicle unit, and that the vehicle unit includes one or more wheel units and one or more actuators configured to provide torque and/or steering for the one or more wheel units. The slave control allocator is assumed to be associated with the vehicle unit and communicatively connected to a master control allocator of the distributed control allocation system, and connected to one or more actuators (of its associated vehicle unit). The method includes: receiving a vehicle unit-specific virtual control input for the vehicle unit from the master control allocator; calculating a vehicle unit-specific true control input for the vehicle unit based on the vehicle unit-specific virtual control input, by attempting to solve a vehicle unit-specific control allocation problem, and controlling the one or more actuators connected to the slave control allocator based on the calculated unit-specific true control input.

In some embodiments of the method, the method may further include receiving actuator-limitations of the one or more actuators connected to the slave control allocator, and using the received actuator-limitations as input to the vehicle unit-specific control allocation problem.

In some embodiments of the method, the method may further include calculating vehicle unit-specific force- and/or moment-limitations for the vehicle unit based on the received actuator-limitations of the one or more actuators connected to the slave control allocator, and sending the calculated vehicle unit-specific force- and/or moment-limitations to the master control allocator.

In some embodiments of the method, the actuator-limitations may include limitations on torque ($T_{ij,lim}$) and/or steering ($\delta_{ij,lim}$) providable by the one or more actuators.

The method of the third aspect may thus correspond to the steps performed by a slave control allocator in the method of the first aspect (or any embodiment thereof as disclosed herein).

According to a fourth aspect of the present disclosure, a distributed control allocation system for a vehicle combination is provided. It is assumed that the vehicle combination includes a plurality of vehicle units, and that each vehicle unit includes one or more wheel units and one or more actuators configured to provide torque and/or steering for the one or more wheel units. The system includes a master control allocator, and a plurality of slave control allocators each communicatively connectable to the master control allocator and to the one or more actuators. The master control allocator includes first processing circuitry configured to cause the master control allocator to: receive a vehicle combination-specific virtual control input; obtain information indicative of one or more slave control allocators connected to the master control allocator; and calculate a vehicle unit-specific virtual control input for each slave control allocator connected to the master control allocator based on the received vehicle combination-specific virtual control input, by attempting to solve a vehicle combination-specific control allocation problem. Each slave control allocator includes second processing circuitry configured to cause the slave control allocator to: obtain information indicative of one or more actuators connected to the slave control allocator; receive the vehicle unit-specific virtual control input from the master control allocator; calculate a vehicle unit-specific true control input based on the vehicle unit-specific virtual control input received from the master control allocator, by attempting to solve a vehicle unit-specific control allocation problem, and control the one or more actuators connected to the slave control allocator based on the calculated vehicle unit-specific true control input. The distributed control allocation system may thus be configured to perform the method of the first aspect.

In some embodiments of the system, the first processing circuitry may be further configured to cause the master control allocator to perform any embodiment of the method of the second aspect as disclosed herein.

In some embodiments of the system, the second processing circuitry of each slave control allocator may be further configured to cause the slave control allocator to perform any embodiment of the method of the third aspect as disclosed herein.

According to a fifth aspect of the present disclosure, a master control allocator for a distributed control allocation system for a vehicle combination is provided. As before, it is assumed that the vehicle combination includes a plurality of vehicle units, and that each vehicle unit includes one or more wheel units and one or more actuators configured to provide torque and/or steering for the one or more wheel units. The master control allocator is communicatively connectable to a plurality of slave control allocators of the distributed control allocation system, and includes processing circuitry configured to cause the master control allocator to: receive a vehicle combination-specific virtual control input; obtain information indicative of one or more slave control allocators connected to the master control allocator; calculate a vehicle unit-specific virtual control input for each slave control allocator connected to the master control allocator based on the received vehicle combination-specific virtual control input, by attempting to solve a vehicle combination-specific control allocation problem, and send the calculated vehicle unit-specific virtual control inputs to the respective slave control allocators connected to the master control allocator. The master control allocator may thus be configured to e.g. perform the method of the second aspect.

In some embodiments of the master control allocator, the first processing circuitry may be further configured to cause the master control allocator to perform any embodiment of the method of the second aspect as disclosed herein.

According to a sixth aspect of the present disclosure, a slave control allocator for a distributed control allocation system for a vehicle combination is provided. It is assumed that the vehicle combination includes a vehicle unit, and that the vehicle unit includes one or more wheel units and one or more actuators configured to provide torque and/or steering for the one or more wheel units. The slave control allocator is communicatively connectable to a master control allocator of the distributed control allocation system and to one or more actuators (of its associated vehicle unit). The slave control unit includes second processing circuitry configured to cause the slave control allocator to: obtain information indicative of one or more actuators connected to the slave control allocator; receive a vehicle unit-specific virtual control input from the master control allocator; calculate a vehicle unit-specific true control input based on the vehicle unit-specific virtual control input received from the master control allocator, by attempting to solve a vehicle unit-specific control allocation problem, and control the one or more actuators connected to the slave control allocator based on the calculated vehicle unit-specific true control input. The slave control allocator may thus be configured to e.g. perform the method of the third aspect.

In some embodiments of the slave control allocator, the second processing circuitry may be further configured to cause the slave control allocator to perform any embodiment of the method of the third aspect as disclosed herein.

According to a seventh aspect of the present disclosure, a vehicle combination is provided. The vehicle combination includes a plurality of coupled vehicle units, where each vehicle unit includes one or more wheel units and one or more actuators configured to provide torque and/or steering for the one or more wheel units. The vehicle combination further includes a distributed control allocation system (such as the distributed control allocation of the fourth aspect, or any embodiment thereof disclosed herein). The master control allocator of the system is communicatively connected to each of the slave control allocators, and each slave control allocator is associated with a respective vehicle unit and connected to one or more actuators of the associated vehicle unit. Phrased differently, the system is configured such that the number of slave control allocators matches the number of vehicle units.

In some embodiments of the vehicle combination, the one or more actuators of each vehicle unit may include at least one of an electric machine, a service brake, and a steering servo arrangement.

According to an eight aspect of the present disclosure, a vehicle unit is provided. The vehicle unit includes at least one of i) a master control allocator (such as the master control allocator of the fifth aspect, or any embodiment thereof disclosed herein), and ii) a slave control allocator (such as the slave control allocator of the sixth aspect, or any embodiment thereof disclosed herein).

According to a ninth aspect of the present disclosure, a computer program for a master control allocator in a distributed control system of a vehicle combination is provided. It is assumed that the vehicle combination includes a plurality of vehicle units, and that each vehicle unit includes one or more wheel units and one or more actuators configured to provide torque and/or steering for the one or more wheel units. It is further assumed that the master control allocator is communicatively connectable to a plurality of slave control allocators of the distributed control allocation system. The computer program includes computer code that, when running on processing circuitry of the master control allocator, causes the master control allocator to: receive a vehicle combination-specific virtual control input; obtain information indicative of one or more slave control allocators connected to the master control allocator; calculate a vehicle unit-specific virtual control input for each slave control allocator connected to the master control allocator based on the received vehicle combination-specific virtual control input, by attempting to solve a vehicle combination-specific control allocation problem, and send the calculated vehicle unit-specific virtual control inputs to the respective slave control allocators connected to the master control allocator. The computer program may thus be configured to cause the master control allocator to e.g. perform the method of the second aspect.

In some embodiments of the computer program, the computer code is further such that it, when running on the processing circuitry of the master control allocator, causes the master control allocator to perform any embodiment of the method of the second aspect as disclosed herein.

According to a tenth aspect of the present disclosure, a computer program for a slave control allocator in a distributed control system of a vehicle combination is provided. It is assumed that the vehicle combination includes a vehicle unit, and that the vehicle unit includes one or more wheel units and one or more actuators configured to provide torque and/or steering for the one or more wheel units. It is further assumed that the slave control allocator is communicatively connectable to a master control allocator of the distributed control allocation system and to the one or more actuators of the vehicle unit. The computer program includes computer code that, when running on processing circuitry of the slave control allocator, causes the slave control allocator to: obtain information indicative of one or more actuators connected to the slave control allocator; receive a vehicle unit-specific virtual control input from the master control allocator; calculate a vehicle unit-specific true control input based on the vehicle unit-specific virtual control input received from the master control allocator, by attempting to solve a vehicle unit-specific control allocation problem, and control the one or more actuators connected to the slave control allocator based on the calculated vehicle unit-specific true control input. The computer program may thus be configured to cause the slave control allocator to e.g. perform the method of the third aspect.

In some embodiments of the computer program, the computer code is further such that it, when running on the processing circuitry of the slave control allocator, causes the slave control allocator to perform any embodiment of the method of the third aspect as disclosed herein.

According to an eleventh aspect of the present disclosure, a computer program product is provided. The computer program product includes a computer-readable storage medium on which a computer program (such as the computer program of the ninth aspect, or any embodiment thereof disclosed herein) is stored.

According to a twelfth aspects of the present disclosure, there is also provided another such computer program product, but where computer-readable storage medium instead stores the computer program of the tenth aspect (or any embodiment thereof disclosed herein).

In embodiments of the computer program products of the eleventh and twelfth aspects, the computer-readable storage medium may be non-transitory.

Other objects and advantages of the present disclosure will be apparent from the following detailed description, the drawings and the claims. Within the scope of the present disclosure, it is envisaged that all features and advantages described with reference to e.g. the method of the first aspect are relevant for, apply to, and may be used in combination with also any feature and advantage described with reference to the methods of the second and third aspects, the system and control allocators of the fourth, fifth and sixth aspects, the vehicle combination and vehicle unit of the seventh and eight aspects, and the computer programs and computer program products of the ninth to twelfth aspects, and vice versa.

BRIEF DESCRIPTION OF THE DRAWINGS

Exemplifying embodiments will now be described below with reference to the accompanying drawings, in which.

Figure 1:
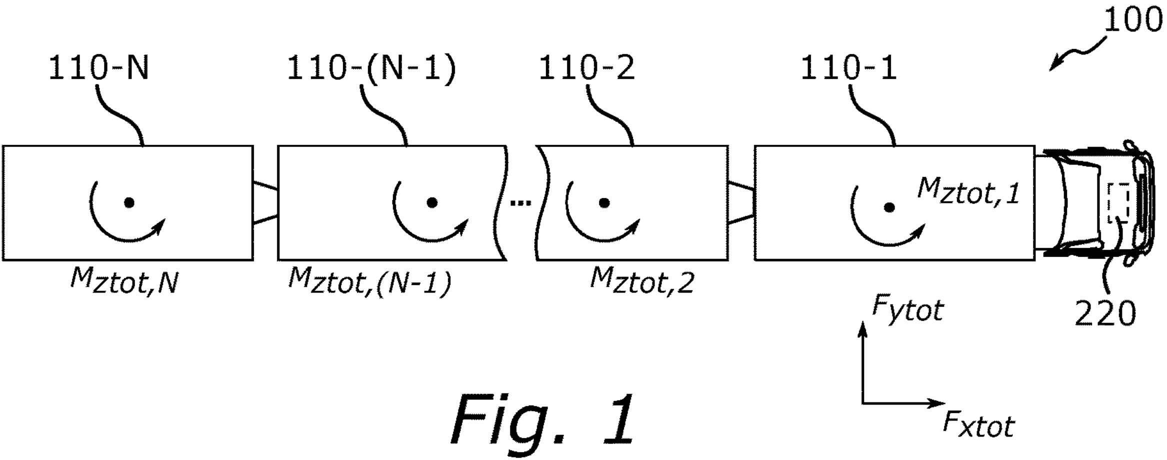
FIG. 1 schematically illustrates a convention vehicle combination including multiple vehicle units.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the Figures, the (absolute or relative) sizes of elements and regions may be exaggerated or understated vis-à-vis their true values for illustrative purposes and, thus, are provided to illustrate the general structures of the embodiments.

DETAILED DESCRIPTION

How control allocation is conventionally used to control the actuators of a multi-unit vehicle combination will now be described in more detail with reference to FIG. 1 and FIG. 2.

FIG. 1 schematically illustrates a top-view of a conventional vehicle combination 100. The vehicle combination 100 includes multiple vehicle units 110-1 to 110-N, i.e. a total of N vehicle units, which are all coupled to form a vehicle combination train. The first vehicle unit 110-1 is in this case a truck, and the remaining vehicle units 110-2 to 110-N are trailers which are connected in series to the truck 110-1.

The vehicle combination 100 further includes a control allocator 220, which may be provided e.g. (as shown) as part of the truck 110-1. The control allocator 220 may e.g. be implemented as code running on a processing circuitry, or similar. The task of the control allocator 220, as will be described in more detail further below, is to calculate how various actuators (not shown) of the vehicle combination 100 are to be controlled in order to generate requested global forces of the vehicle combination 100 as a whole.

Examples of such actuators may e.g. be various electric machines and/or service brakes, or e.g. steering servo arrangements, distributed among the vehicle units 110-1 to 110-N in order to provide torque and/or steering of the wheel units (also not shown) of the vehicle units 110-1 to 110-N. As mentioned earlier herein, an "electric machine" can e.g. be an electric motor. It is also common to use electric motors which may also be operated as generators, in order for the electric motors to also, when required, generate braking force. Examples of requested global forces of the vehicle combination 100 as a whole may e.g. include a total longitudinal/axial force $F_{xtot}$, a total lateral/radial force $F_{ytot}$, and/or e.g. one or more yaw moments $M_{ztot,1}$, $M_{ztot,2}$, . . . , $M_{ztot,N}$ for the respective vehicle units 110-1 to 110-N.

Figure 2:
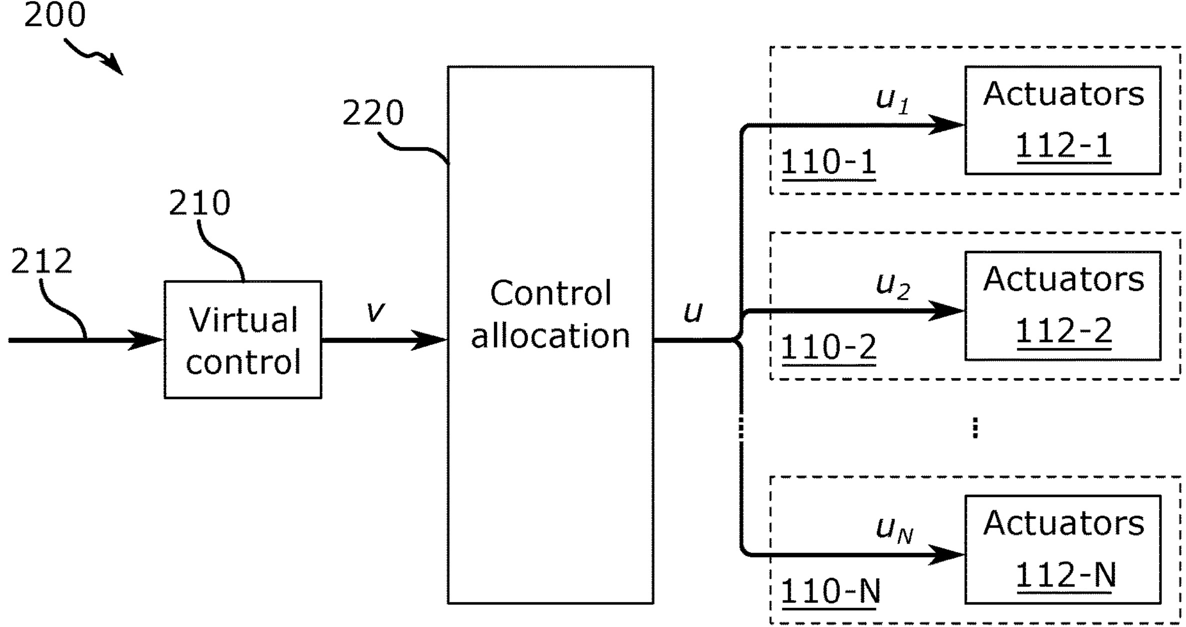
FIG. 2 schematically illustrates, in terms of functional blocks, a conventional way of performing control allocation in the vehicle combination of FIG. 1.

FIG. 2 schematically illustrates, in terms of various functional units/modules/blocks, a conventional method of control allocation in the vehicle combination 100 . . . . A virtual control unit 210 receives a signal 212 from e.g. a steering wheel and/or gas/brake pedal of the vehicle unit 100, indicating that the driver (or some other system of the vehicle combination 100) wants to change e.g. the direction and/or the speed of the vehicle combination in a certain way. If not originating from the driver, the signal 212 may of course also originate from elsewhere, e.g. from a lane assist system, a lane following system, an emergency steering system, an emergency braking system, an automated or semi-automated drive system, or any other system which may provide some indication of how the overall forces of the vehicle combination 100 are to be influenced (e.g. steered, propelled or braked).

The virtual control unit 210 receives the signal 212 and calculates what forces and/or moments that need to be applied to the vehicle combination as a whole in order to follow the wish indicated by the signal 212. The result of such a calculation is a virtual control input v. The virtual control input v may for example be a vector $$v = [F_{xtot}, F_{ytot}, M_{ztot,1}, M_{ztot,2}, \ldots, M_{ztot,N}]^T,$$

where $F_{xtot}$, $F_{ytot}$ and $M_{ztot,i}$ are the requested global forces and yaw moments as mentioned above, and where N is an integer indicating the total number of vehicle units in the vehicle combination 100.

The virtual control input v is provided to the control allocation unit (or "control allocator") 220 whose task it is to solve a control allocation problem in order to find a particular true control input u which satisfies the received virtual control input v. The true control input u is another vector which contains data indicative of what forces respective actuators 112-1 to 112-N of the vehicle units 110-1 to 110-N are to produce in order for the generated forces to meet the requested virtual control input v. As electric motors and service brakes generate torque instead of linear forces, it is assumed that e.g. the control allocation unit 220 and/or the vehicle units 110-1 to 110-N (which receive the signal u) understand how to convert/translate the received true control input u into actual steering commands for the actuators. For example, by knowing e.g. a radius r of a wheel (unit), the longitudinal force generated by such a wheel is proportional to a torque applied to the wheel (unit) divided by the radius. By having knowledge also of other factors, such as road friction, losses due to transmissions, differentials, and similar, etc., a true control input in form of a force to be generated by an actuator (i.e. a longitudinal force generated by a wheel (unit) driven over a particular surface) can be translated into a required torque that needs to be applied on the wheel (unit) to generate such a longitudinal force.

Generally, for N vehicle units, the true control input u provided from the control allocation unit 220 may be e.g.

$$u = [T_{1,1}, \ldots, T_{1,M_1}, \ldots, T_{N,1}, \ldots, T_{N,M_N}, \delta_{1,1}, \ldots \delta_{1,K_1}, \ldots, \delta_{N,1}, \ldots, \delta_{N,K_N}]^T,$$

where $T_{n,m}$ is a torque which is to be generated by the m:th actuator of the n:th vehicle unit, where $\delta_{n,k}$ is a steering angle to be applied to the k:th steering-actuator of the n:th vehicle unit, and where $M_n$ is the number of torque-producing actuators of the n:th vehicle unit and $K_n$ is the number of steering-actuators of the n:th vehicle unit.

It should be noted that if the number of components of the true control input u exceeds the number of components of the virtual control input v, the vehicle combination 100 is over-actuated and the problem of controlling such a vehicle combination 100 is underdetermined as there then exists multiple possible solutions u which all satisfy the requirement stated by v.

As a response to such over-actuation and underdetermination, the control allocation task solved by the control allocation unit 220 can be reformulated as the task of solving a sequential least-squares optimization problem $$u = \arg\min_{u} \left\{ \| W_u(u - u_{ref}) \| : u \in \arg\min_{\underline{u} < u < \overline{u}} \| W_v(Bu - v) \| \right\}, \tag{1}$$

where $u_{ref}$ is a preferred/desired reference control input, $W_u$ and $W_v$ are (positive definite) weighting matrices, B is a control efficiency matrix, and $\underline{u}$ and $\overline{u}$ are lower and upper capabilities of the various actuators, respectively, all defined and used as conventionally done in control allocation theory.

Solving the above problem as defined by equation (1) is often not tractable, and in particularly not in real-time. For this reason, the control allocation unit 220 may instead strive to solve a weighted least squares optimization problem $$u = \arg\min_{\underline{u}<u<\overline{u}} \left(\|W_u(u-u_{ref})\|^2 + \gamma\|W_v(Bu-v)\|^2\right), \quad (2)$$

where $\gamma$ is a weighting factor, such that when $\gamma\rightarrow\infty$, the solution of the weighted least squares problem of equation (2) approaches the solution of the sequential least squares problems of equation (1).

As mentioned in the introductory part of the present disclosure, a problem with the conventional solution (as generated by the control allocator 220) is that the control allocator 220 is specifically tailored to a particular vehicle combination, i.e. to a specific combination of vehicle units and actuators in each vehicle unit. As soon as e.g. a vehicle unit is connected or removed from the vehicle combination 100, and/or as soon as e.g. the exact configuration of actuators in one of the vehicle units 110-1 to 110-N changes, the control allocator 220 often has to be re-developed before control allocation can be performed for the new vehicle combination (configuration). This reduces the flexibility of the control allocator and the vehicle combination as a whole, as major reconfigurations have to be performed each time the vehicle combination changes. It may of course be such that the control allocator contains a set of prestored configurations for different, predefined vehicle combinations. This may help to at least partially alleviate the situation, but would still provide little use if e.g. a new, not previously assumed vehicle combination is created.

How the present disclosure solves the above issue will now be described in more detail with reference first to FIGS. 3 and 4A to 4D. A particular example of the solution of the present disclosure being applied to a specific vehicle combination will later be described with reference also to FIGS. 5A to 5C.

Figure 3:
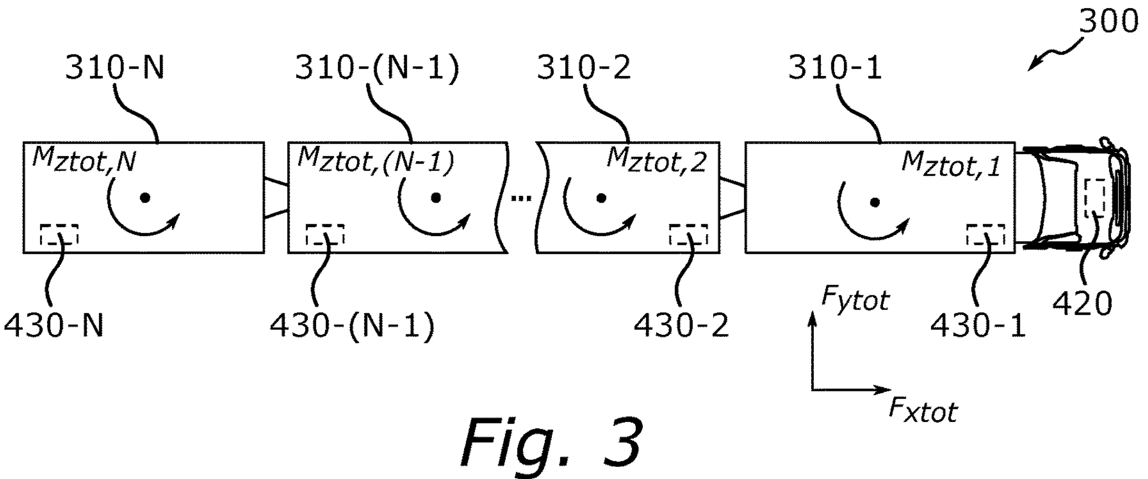
FIG. 3 schematically illustrates various embodiments of a vehicle combination including multiple vehicle units in accordance with the present disclosure.

FIG. 3 schematically illustrates a top-view of an embodiment of a vehicle combination 300 according to the present disclosure. The vehicle combination 300 may be the same as the vehicle combination 100 described with reference to FIG. 1, except that the single control allocator 220 has now been replaced by a master control allocator 420 and several slave control allocators 430-1 to 430-N, where, as before, N is an integer indicating a total number of vehicle units in the vehicle combination 300. The master control allocator 420 and the various slave control allocators 430-1 to 430-N together form a distributed control allocation system for the vehicle combination 300, in which the control allocation is instead, contrary to the method 200 described with reference to FIG. 2, performed on multiple levels, i.e. first on a level of the vehicle combination 100 as a whole, and then on a level of each vehicle unit 310-1 to 310-N individually. Together, this distributed control allocation system thus solves the same task as before, namely to calculate how to control each of one or more actuators (not shown) distributed among the vehicle units 310-1 to 310-N and configured to provide torque and/or steering for one or more wheel units (also not shown) of the vehicle units 310-1 to 310-N, in order to satisfy a virtual control input $v_{vc}$ (which may, e.g., include the requested forces $F_{xtot}$ and $F_{ytot}$, and yaw moments $M_{ztot,1}$, $M_{ztot,2}$, . . . , $M_{ztot,N}$).

Figure 4A:
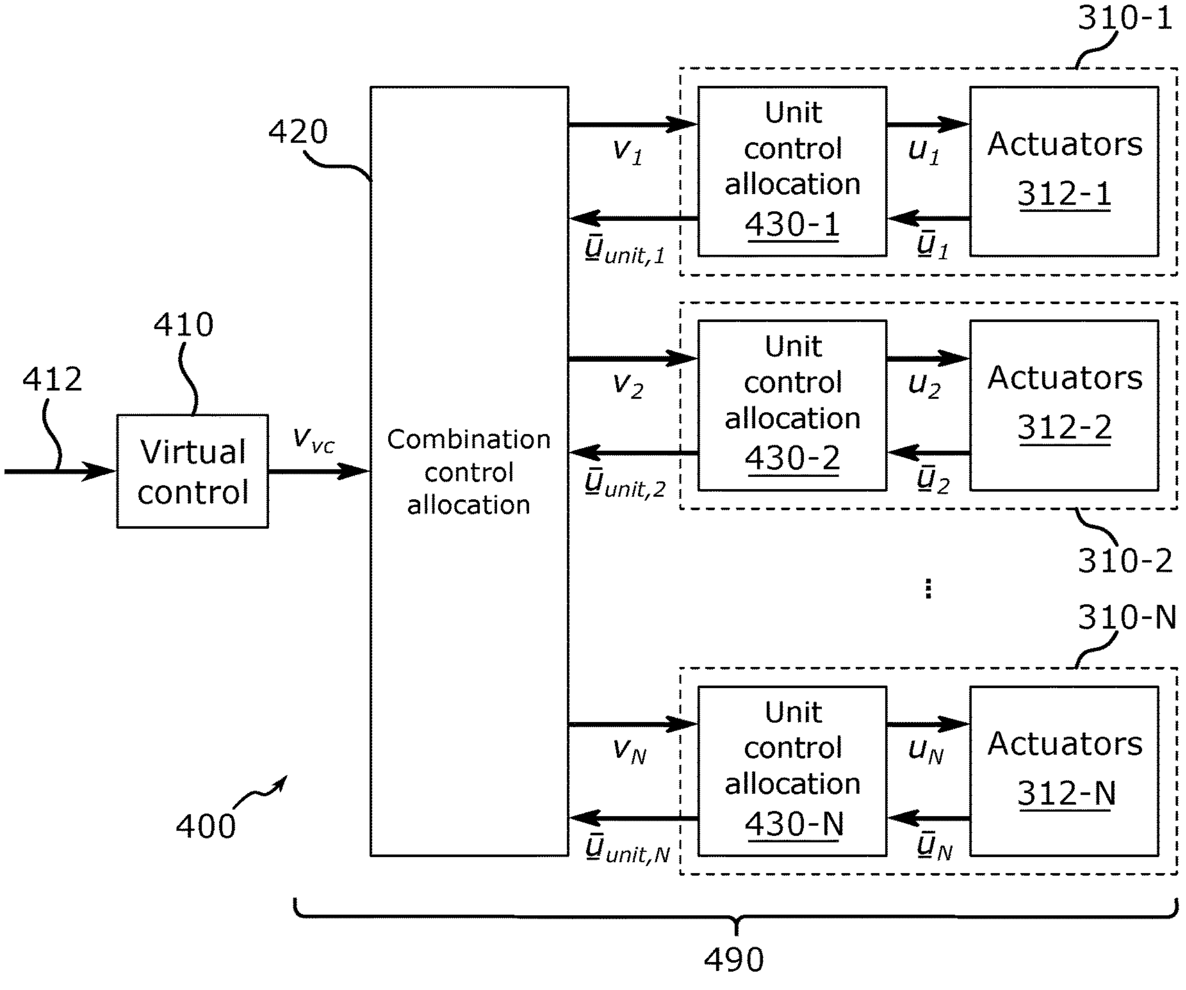
FIG. 4A schematically illustrates, in terms of functional blocks, various embodiments of control allocation in the vehicle combination of FIG. 3 according to the present disclosure, as well as a distributed control system for such control allocation.
Figure 4B:
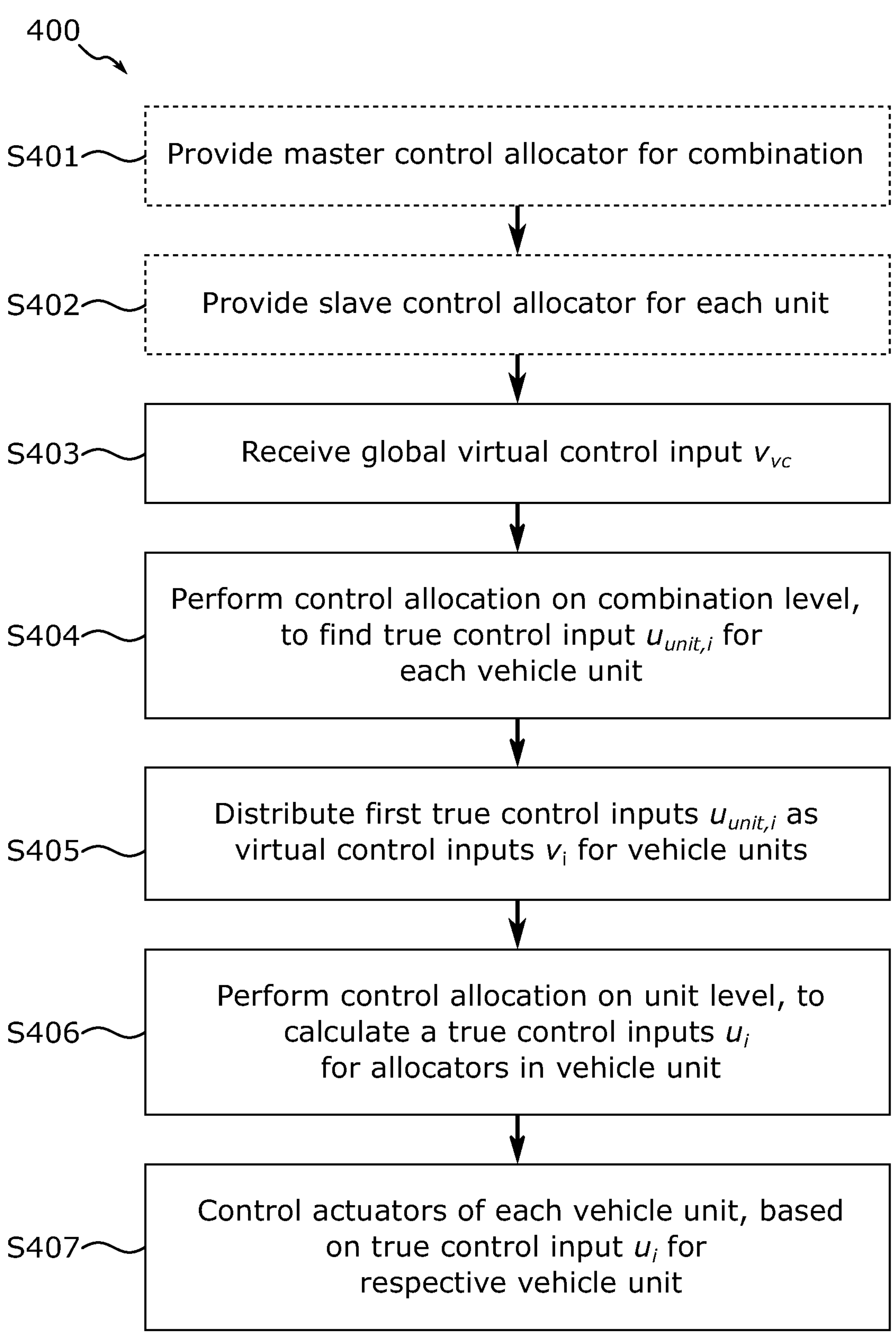
FIG. 4B schematically illustrates a flow of various embodiments of a method of control allocation performed in a distributed control allocation system according to the present disclosure.

FIG. 4A schematically illustrates, using various functional units/modules/blocks, an embodiment of a method 400 of distributed control allocation according to the present disclosure, while FIG. 4B schematically illustrates a flow of such a method 400.

As in the conventional method 200 described with reference to FIG. 2, a virtual control unit 410 receives a signal 412 from e.g. the driver, indicating how the driver (or some other system of the vehicle combination 300) wants the vehicle combination 300 to behave (e.g. a request to change a direction and/or speed of the vehicle combination, or similar). The virtual control unit 410 translates the signal 412 into a virtual control input $v_{vc}$ for the vehicle combination as a whole, i.e. a vehicle combination-specific virtual control input. Hereinafter, the terms "vehicle combination-specific" and just "combination-specific" will be used interchangeably, and the same also applies to the terms "vehicle unit-specific" and just "unit-specific".

Contrary to the conventional method 200, in the method 400, the combination-specific virtual control input $v_{vc}$ is provided to and received by (in a step S403) a combination control allocation unit (i.e. a "master control allocator") 420. The master control allocator may be provided as part of the method 400, in e.g. a step S401. The master control allocator 420 performs control allocation (in a step S404) on a combination level, including making an attempt to solve a combination-specific control allocation problem in order to calculate unit-specific virtual control inputs $v_i$ ($i\in[1,N]$) for each vehicle unit 310-1 to 310-N, based on the received combination-specific virtual control input $v_{vc}$.

This combination-specific control allocation may e.g. be defined as the weighted least-squares problem $$u_{unit} = \arg\min_{\underline{u}_{unit}\le u_{unit}\le\overline{u}_{unit}} \left(\left\|W_{u_{vc}}(u_{unit}-u_{refvc})\right\|^2 + \gamma_{vc}\left\|W_{v_{vc}}(B_{vc}u_{unit}-v_{vc})\right\|^2\right), \quad (3)$$

where $W_{u_{vc}}$ and $W_{v_{vc}}$ are combination-specific (positive definite) weighting matrices, $B_{vc}$ is a combination-specific control efficiency matrix, $\underline{u}_{unit}$ and $\overline{u}_{unit}$ are lower and upper capabilities of the various vehicle units, $u_{refvc}$ is a combination-specific desired reference control input, and $\gamma_{vc}$ is a (combination-specific) weighting factor as described earlier herein.

If having N vehicle units in total, the combination-specific virtual control input $v_{vc}$ may for example be $$v_{vc} = [F_{xtot}, F_{ytot}, M_{ztot,1}, \ldots, M_{ztot,N}]^T,$$

and the capabilities of the various vehicle units may e.g. be $$\underline{u}_{unit} = [\underline{F}_{x,1}, \underline{F}_{y,1}, \underline{M}_{z,1}, \ldots, \underline{F}_{x,N}, \underline{F}_{y,N}, \underline{M}_{z,N}] = [\underline{u}_{unit,1}, \ldots, \underline{u}_{unit,N}]$$

and $$\overline{u}_{unit} = [\overline{F}_{x,1}, \overline{F}_{y,1}, \overline{M}_{z,1}, \ldots, \overline{F}_{x,N}, \overline{F}_{y,N}, \overline{M}_{z,N}] = [\overline{u}_{unit,1}, \ldots, \overline{u}_{unit,N}],$$

where $\underline{u}_{unit,n} = [\underline{F}_{x,n}, \underline{F}_{y,n}, \underline{M}_{z,n}]$ and $\overline{u}_{unit,n} = [\overline{F}_{x,n}, \overline{F}_{y,n}, \overline{M}_{z,n}]$ are the lower and upper limitations, respectively, of the longitudinal force, lateral force, and yaw moment, that is generatable by the n:th vehicle unit.

The true control input vector $u_{unit}$ generated by solving the problem defined by equation (3) can e.g. be defined as $$u_{unit} = [F_{x,1}, F_{y,1}, M_{z,1}, \ldots, F_{x,N}, F_{y,N}, M_{z,N}]^T = [u_{unit,1}, \ldots, u_{unit,N}]^T,$$

where $u_{unit,n}=[F_{x,n},F_{y,n},M_{z,n}]$ is a unit-specific solution including the desired lateral and longitudinal forces, and the yaw moment, to be generated by/for the n:th vehicle unit.

After having solved the problem as defined in equation (3), the master control allocator thus obtains unit-specific solutions, i.e. $u_{unit,i}$, for all vehicle units 310-1 to 310-N.

Also contrary to the method 200, in the method 400, the master control allocator 420 then provides/distributes (e.g. sends, as part of a step S405) the unit-specific solutions $u_{unit,i}$ as unit-specific virtual control inputs $v_i$ (e.g. such that $v_i=u_{unit,i}$) to a plurality of unit control allocation units (i.e. "slave control allocators") 430-1 to 430-N, each associated with a particular vehicle unit 310-1 to 310-N. The slave control allocators may e.g. be provided as part of the method 400, in e.g. a step S402. The unit-specific virtual control inputs $v_i$ are provided to the respective slave control allocators 430-1 to 430-N such that i.e. each particular slave control allocator 430-*i* preferably receives only a particular unit-specific virtual control input $v_i$ specific only for the particular slave control allocator 430-*i*. Each slave control allocator 430-*i* thus receives virtual control input information pertinent only to itself and its associated vehicle unit 310-*i*, and is thus not concerned with any virtual control input information provided to any other slave control allocator.

After having received its unit-specific virtual control input $v_i$ (as part of the step S405), each slave control allocator 430-*i* then performs (in a step S406) control allocation on a unit level, in order to calculate a unit-specific true control input $u_i$ for its associated vehicle unit 430-*i*. This is achieved by the slave control allocator 430-*i* attempting to solve a unit-specific control allocation problem based on the received unit-specific virtual control input $v_i$. This unit-specific control allocation problem can e.g. be defined as the weighed least squares problem $$u_i = \arg\min_{\underline{u}_i \le u_i \le \overline{u}_i} \left( \left\| W_{u_i}(u_i - u_{ref,i}) \right\|^2 + \gamma_i \left\| W_{v_i}(B_i u_i - v_i) \right\|^2 \right), \tag{4}$$

where $W_{u_i}$ and $W_{v_i}$ are unit-specific (positive definite) weighting matrices, $B_i$ is a unit-specific control efficiency matrix, $\underline{u}_i$ and $\overline{u}_i$ are lower and upper unit-specific actuator-limitations, respectively, $u_{ref,i}$ is a unit-specific desired reference control input, and $\gamma_i$ is a (unit-specific) weighting factor (as discussed earlier herein), all for the i:th vehicle unit associated with the slave control allocator 430-*i*.

After having solved their own unit-specific control allocation problem as defined in equation (4), each slave control allocator 430-*i* can then obtain its own unit-specific true control input $u_i$ for its actuator(s), where this unit-specific true control input is e.g. defined as $$u_i = \left[T_{i,1}, \ldots, T_{i,M_i}, \delta_{i,1} \ldots, \delta_{i,K_i}\right]^T,$$

where $T_{i,j}$ is the torque to be generated by the j:th torque-generating actuator of the i:th vehicle unit 310-*i* (where $M_i$ is the total number of such torque-generating actuators of the i:th vehicle unit 310-*i*), and where $\delta_{i,k}$ is the steering-angle to be generated by the k:th steering-actuator of the i:th vehicle unit 310-I (wherein $K_i$ is the total number of such steering-actuators of the i:th vehicle unit 310-*i*). If a vehicle unit does not include any torque-generating actuators or steering-actuators, the corresponds torque and/or steering angle values in $u_i$ can then of course be omitted. As used herein, a "torque-generating actuator" means an actuator (such as an electric motor and/or a service brake) configured to apply torque on a wheel unit in order to use the wheel unit to either propel/accelerate or brake the vehicle. Likewise, a "steering-actuator" means an actuator (such as a steering servo arrangement or similar) which is configured to steer a wheel unit of the vehicle unit, where "steer" in this case means that the wheel unit has a steerable angle, and that the actuator is capable of changing this angle (e.g. by also applying torque to the wheel unit).

After having obtained their respective unit-specific true control input $u_i$, the method 400 then includes each slave control allocator 430-*i* using the true control input $u_i$ to control the one or more actuators 312-*i* of the vehicle unit 310-*i* in accordance therewith (e.g. based on). As used herein, "controlling" may include e.g. sending a suitable control signal to the one or more actuators, or e.g. sending a signal instruction some other unit/device responsible for generating such control signals for the one or more actuators. For example, a driving/control circuit for a particular actuator may e.g. form part of the slave control allocator associated with the vehicle unit in which the particular actuator is included, or e.g. be provided as a separate part communicatively connected to the slave control allocator.

It should be noted that FIG. 4A also serves to illustrate, as the various functional units 420 and 430-*i*, a distributed control allocation system 490 as envisaged herein.

Generally herein, that one entity is "communicatively coupled" or "communicatively connected" to another entity means that the two entities are thus able to exchange information, e.g. by sending one or more signals between them. The sending of the signals can e.g. be performed using one or more wires/cables suitable therefore, or e.g., in addition or instead, by using one or more suitable wireless interfaces and communication techniques. The exact protocol used for such signaling between entities is not important, as long as the information needed for the entities to operate as intended may be exchanged in some way between them. It should be noted that the connection does not need to be direct, but may also be indirect. For example, a master control allocator as envisaged herein may be connected to a first slave control allocator of a first vehicle unit, and the first slave control allocator may in turn be connected to a second slave control allocator, and so on, such that signals from a distance slave control allocator passes through one or more other slave control allocators before reaching the master control allocator, and vice versa, in a daisy-chain fashion. In other embodiments, the master control allocator may be connected directly to each slave control allocator in a star-topology fashion. In yet other embodiments, all master and slave control allocators may be connected to a same communication bus, such that each entity may communicate with all other entities on the communication bus. As mentioned before, the connections between the master and slave control allocators may be wired, wireless, or include combinations of both wired and wireless technologies.

Additionally, the actuators 312-*i* of a particular vehicle unit 310-*i* can be capable of estimating their own limitations, e.g. how much and/or how fast the actuators can e.g. move at a current time instance. The capabilities/limitations of the actuators can e.g. change depending on how the vehicle combination or vehicle unit is currently loaded, on a current road surface, on friction and/or temperature conditions of e.g. the wheel units used to transfer the forces/moments of the actuators on to the ground on which the vehicle combination/unit is currently travelling, etc. The actuators may update and send their limitations/capabilities in real time, such that the respective slave control allocators 430-*i* has real-time information about the capabilities/limitations of its associated actuators 310-*i*.

A slave control allocator 430-*i* as envisaged herein can thus receive the actuator-limitations $\overline{u}_i=[\underline{u}_i, \overline{u}_i]$ of its associated actuators, e.g. from the actuators themselves, where for example $$\underline{u}_i = [\underline{T}_{i,1}, \ldots, \underline{T}_{i,M_i}, \underline{\delta}_{i,1}, \ldots, \underline{\delta}_{i,K_i}]$$

and $$\overline{u}_i = [\overline{T}_{i,1}, \ldots, \overline{T}_{i,M_i}, \overline{\delta}_{i,1}, \ldots \overline{\delta}_{i,K_i}]$$

are the lower and upper limitations of the actuators 312-*i* of the i:th vehicle unit 310-*i*, respectively, where $\underline{T}_{i,j}$ and $\overline{T}_{i,j}$ are the lower and upper limitations of the j:th torque-generating actuator of the i:th vehicle unit 310-I, respectively, and where $\underline{\delta}_{i,k}$ and $\overline{\delta}_{i,k}$ are the lower and upper limitations of the k:th steering-actuator of the i:th vehicle unit 310-*i*, respectively. In other embodiments, these limitations may e.g. be received by the respective slave control allocator 430-*i* from some other part of the vehicle combination 100 or the distributed control allocation system 490 having access to such information, preferably in real time. The slave control allocator 430-*i* may use the associated actuator-limits as input to its unit-specific control allocation problem, as defined in equation (4).

As shown in FIG. 4A, it should be further noted that each slave control allocator 430-*i* may also use the actuator-limitations $u_{lim,i}$ to calculate the unit-specific force- and/or moment limitations $u_{unit,i}$ and $\overline{u}_{unit,i}$ used by the master control allocator 420 when solving the combination-specific control allocation problem defined in equation (3) earlier herein. In some embodiments, each slave control allocator 430-*i* may thus be configured to calculate and send the respective unit-specific limitations to the master control allocator 420, e.g. as a unit-specific limitation vector $\overline{u}_{unit,i}=[\underline{u}_{unit,i}, \overline{u}_{unit,i}]$, such that the master control allocator 420 can based thereon create the vectors $\underline{u}_{unit}$ and $\overline{u}_{unit}$ required for solving the combinations-specific control allocation problem of equation (3).

Figures 4C, 4D:
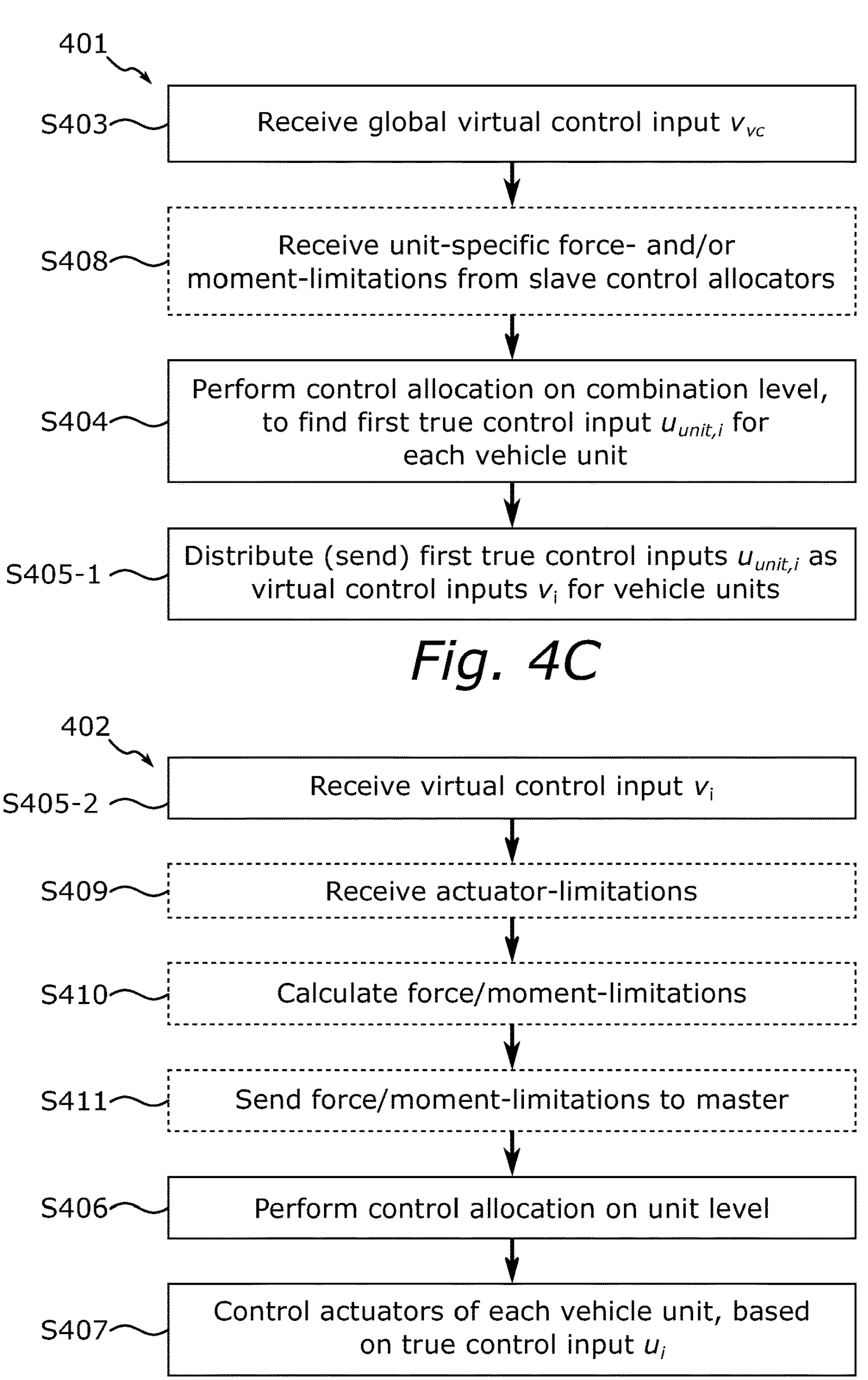
FIGS. 4C and 4D schematically illustrate a flow of various embodiments of a method performed in a master control allocator and a slave control allocator, respectively, according to the present disclosure.

FIG. 4C schematically illustrates flows of various embodiments of a method 401 performed in a master control allocator (such as the master control allocator 420) envisaged herein. FIG. 4C thus shows only such steps of e.g. the method 400 that are performed specifically in the master control allocator. For example, the method 401 may include the steps S403, S404 and S405-1. In some embodiments, the method 401 may further include a step S408 in which the master control allocator receives the unit-specific force- and/or moment-limitations $\underline{\overline{u}}_{unit,i}$ (e.g. from the respective slave control allocators), such that the master control allocator 420 may use these unit-specific limitations as input to its combination-specific control allocation problem. The step S408 is performed before or at the same time as the step S404 of performing the control allocation on the combination level.

FIG. 4D schematically illustrates flows of various embodiments of a method 402 performed in a slave control allocator (such as any of the slave control allocators 430-1 to 430-N, i.e. 430-*i*) envisaged herein. FIG. 4D thus shows only such steps of e.g. the method 400 that are performed specifically in the slave control allocator. For example, the method 402 may include the steps S405-2, S406 and S407. In some embodiments, the method 402 may further include a step S409 in which the slave control allocator receives the actuator-limitations u from the associated actuators connected to the slave control allocator, and e.g. uses the received actuator-limitations $\underline{\overline{u}}_i$ as input to its unit-specific control allocation problem. In some embodiments, the method 402 may e.g. also include a step S410 in which the slave control allocator calculates the unit-specific force- and/or moment-limitations $\underline{\overline{u}}_{unit,i}$ based on the actuator-limitations $\underline{\overline{u}}_i$, and an additional step S411 in which the slave control allocator then sends the calculated limitations $\underline{\overline{u}}_{unit,i}$ to the master control allocator. The steps S409, S410 and S411 (if included) may e.g. be performed before or at a same time as the slave control allocator performs the step S406. Steps S410 and S411 are preferably synchronized with the performance of the master control allocator, such that the slave control allocator can perform these steps before the master control allocator performs e.g. the step S404 of performing the control allocation on the combination level.

In FIGS. 4C and 4D, the step S405-1 and S405-2, respectively, should be understood as the part of distribution step S405 of the method 400 (as discussed with reference to e.g. FIG. 4B) performed by the respective one of the master control allocator 420 and slave control allocator 430-*i*.

A particular example of how the envisaged way of distributed control allocation may be performed in a more specific, exemplary vehicle combination will now be described in more detail with reference to FIGS. 5A to 5C.

Figure 5A:
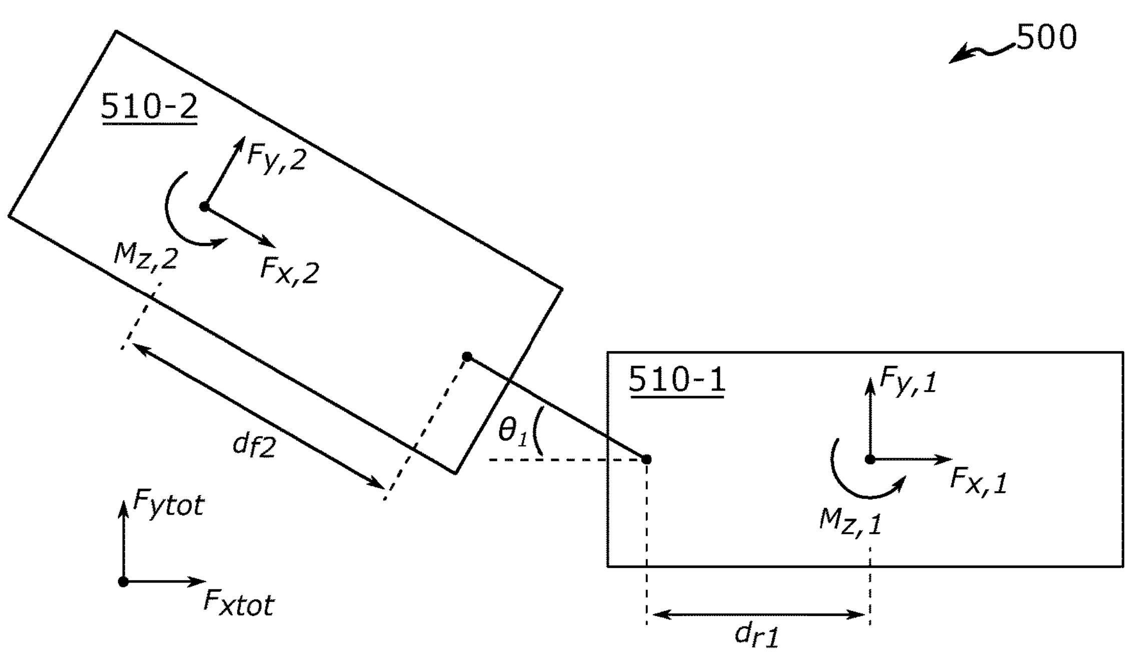
FIGS. 5A to 5C schematically illustrate an example of how to perform distributed control allocation in a multi-unit vehicle combination according to the present disclosure.

FIG. 5A schematically illustrates a top-view of a vehicle combination 500, which includes a first vehicle unit 510-1 and a second vehicle unit 510-2. The vehicle units 510-1 and 510-2 are coupled with e.g. a draw bar, and may therefore form an articulation angle $\theta_1$ between them as shown FIG. 5A. A coupling point 511-1 of the first vehicle unit 510-1 is located at a distance $d_{r1}$ rearward of a center-of-gravity 512-1 of the first vehicle unit 510-1, while a coupling point 511-2 of the second vehicle unit 510-2 is located at a distance $d_{f2}$ forward of a center-of-gravity 512-2 of the second vehicle unit 510-2.

Performing control allocation for the vehicle combination 500 includes the master control allocator 420 determining the unit-specific forces $u_{unit}=[u_{unit,1}, u_{unit,2}]$, where $$u_{unit,1} = [F_{x,1}, F_{y,1}, M_{z,1}]$$

and $$u_{unit,2} = [F_{x,2}, F_{y,2}, M_{z,2}],$$

that would match a requested global, combination-specific virtual control input $$v_{vc} = [F_{x,tot}, F_{y,tot}, M_{ztot,1}, M_{ztot,2}]^T,$$

where the respective yaw moments $M_{ztot,i}$ are the total yaw moments around the center-of-gravities 512-*i* of the respective vehicle units 510-*i*. The master control allocator 420 may receive first unit-specific force- and/or moment-limitations $\bar{\underline{u}}_{unit,1}=[\underline{u}_{unit,1}, \bar{u}_{unit,1}]$ from a first slave control allocator 430-1 associated with the first vehicle unit 510-1, and second such unit-specific limitations $\bar{u}_{unit,2}=[\underline{u}_{unit,2}, \bar{u}_{unit,2}]$ from a second slave control allocator 430-2 associated with the second vehicle unit 510-2, such that $\underline{u}_{unit}=[\underline{u}_{unit,1}, \underline{u}_{unit,2}]$ and $\bar{u}_{unit}=[\bar{u}_{unit,1}, \bar{u}_{unit,2}]$.

The master control allocator 420 may distribute the virtual control input forces on a combination level to each vehicle unit, e.g. as $v_{vc}=B_{vc}u_{unit}$, where $$\underbrace{\begin{bmatrix} F_{xtot} \\ F_{ytot} \\ M_{ztot,1} \\ M_{ztot,2} \end{bmatrix}}_{v_{vc}} = \underbrace{\begin{bmatrix} 1 & 0 & 0 & \cos\theta_1 & \sin\theta_1 & 0 \\ 0 & 1 & 0 & -\sin\theta_1 & \cos\theta_1 & 0 \\ 0 & 0 & 1 & d_{r1}\sin\theta_1 & -d_{r1}\cos\theta_1 & 0 \\ 0 & 0 & 0 & 0 & d_{f2} & 1 \end{bmatrix}}_{B_{vc}} \underbrace{\begin{bmatrix} F_{x,1} \\ F_{y,1} \\ M_{z,1} \\ F_{x,2} \\ F_{y,2} \\ M_{z,1} \end{bmatrix}}_{u_{unit}},$$

and where it is for example seen how the requested yaw-moments $M_{ztot,i}$ relates to the yaw-moments $M_{z,i}$.

From the above definition of $B_{vc}$, the master control allocator 420 may solve the combination-specific control allocation problem defined in equation (3), in order to find $u_{unit}=[u_{unit,1}, u_{unit,2}]$, and may then distribute (i.e. send) the solutions $u_{unit,i}$ as unit-specific virtual control inputs $v_i=\bar{u}_{unit,i}$ to the respective slave control allocators 430-*i*, i.e. such that the first slave control allocator 430-1 receives $v_1$ and the second slave control allocator 430-2 receives $v_2$.

It should be noted that the master control allocator 420 does not assume anything about the internal configuration of each vehicle unit 310-*i*, i.e. about the exact configuration of actuators 312-*i* in each vehicle unit 310-*i* or similar. Instead, the master control allocator 420 only uses the unit-specific force- and/or moment-limitations $\bar{\underline{u}}_{unit,i}$ for the respective vehicle units, as received from the respective slave control allocators. As mentioned herein, this is what makes the master control allocator 420 more general than conventional control allocators (such as the control allocator 220 of the conventional method 200 described with reference to FIG. 2). Adding or removing additional vehicle units would only correspond to, in addition to the master control allocator 420 having to keep track of how many vehicle units and slave control allocators there are, the master control allocator having to update the efficiency matrix $B_{vc}$, based on easily obtainable parameters pertinent to the vehicle units, such as where the coupling points are located in each vehicle unit, and what the current articulation angles between each coupled vehicle-unit pair area. In particular, further knowledge about how the actuators are configured in each vehicle unit is not important for the master control allocator 420 to perform its task of finding and sending the unit-specific virtual control inputs $v_i$ to the respective slave control allocators 430-*i*.

After having received the unit-specific virtual control inputs $v_i$ from the master control allocator 420, the slave control allocators 430-1 and 430-2 are then responsible for finding their own, unit-specific true control outputs $u_1$ and $u_2$, respectively.

Figure 5B:
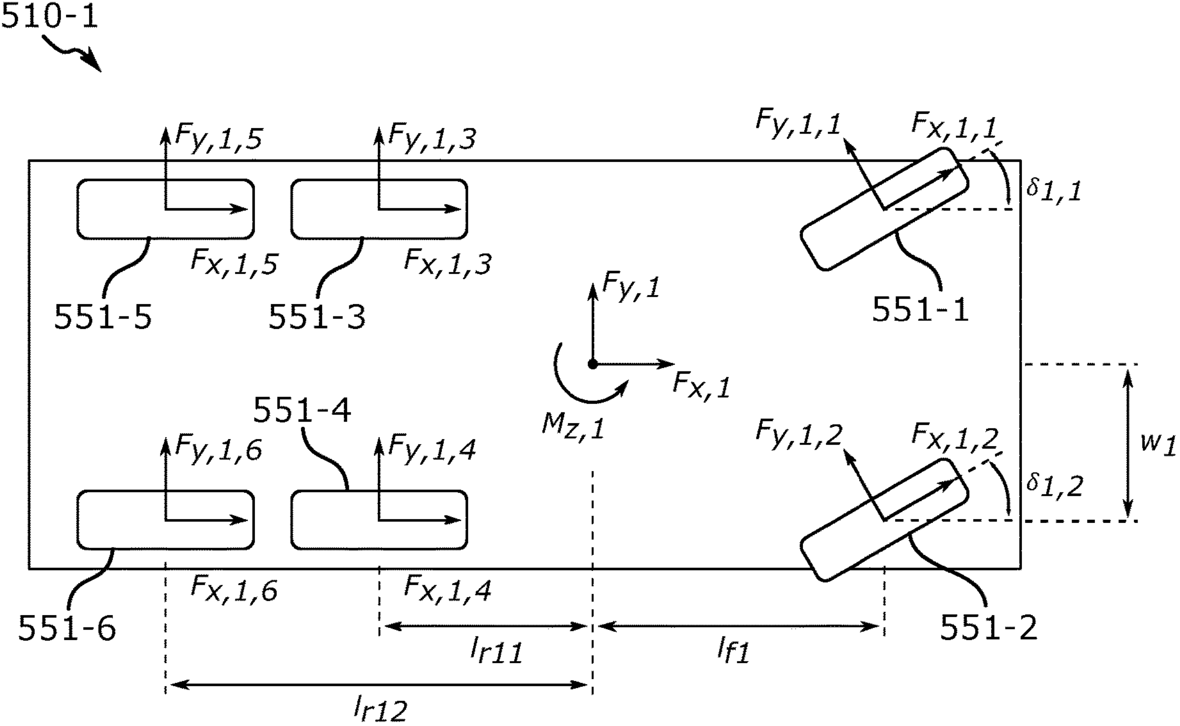

FIG. 5B schematically illustrates a top-view of an example configuration of the first vehicle unit 510-1 and its actuators 312-1. The first vehicle unit 510-1 has a total of six wheel units 551-1 to 551-6 which are distributed on three axles, such that first and second wheel units 551-1 and 551-2 form left and right wheel units of a single front axle, such that third and fourth wheel units 551-3 and 551-4 form left and right wheel units of a first rear axle, and such that fifth and sixth wheel units 551-5 and 551-6 form left and right wheel units of a second rear axle. The front axle is located at a distance $l_{f1}$ forward of the center-of-gravity 511-1, the first rear axle is located at a distance $l_{r11}$ rearward of the center-of-gravity 511-1, and the second rear axle is located at a distance $l_{r12}$ rearward of the center-of-gravity 511-1. The left and right wheel units 551-1 and 551-2 of the front axle are also steerable with a steering angle $\delta_{1,1}=\delta_{1,2}=\delta_1$. It is assumed that there are provided actuators such that all wheel units 551-1 to 551-6 may be individually driven or at least braked, such that the first vehicle unit 510-1 includes six torque-generating actuators (such that $M_1=6$). As the left and right wheel units 551-1 and 551-2 of the front axle are steerable, the first vehicle unit 510-1 further has e.g. two steering-actuators (such that $K_1=2$). It is further assumed that each row of wheel units is located at a distance $w_1$ from a longitudinal center axis (not shown) of the first vehicle unit 510-1.

Based on the above, the task of the first slave control allocator 430-1 associated with the first vehicle unit 510-1 is thus to find, based on the unit-specific virtual control input $$v_1 = [F_{x,1}, F_{y,1}, M_{z,1}]^T$$

received from the master control allocator 420, the unit-specific true control output $$u_1 = [T_{1,1}, T_{1,2}, T_{1,3}, T_{1,4}, T_{1,5}, T_{1,6}, \delta_1]^T,$$

where $T_{1,j}$ is the torque to be applied to the j:th wheel unit 551-*j*, and where it has been further assumed that the two steering angles $\delta_{1,1}$ and $\delta_{1,2}$ of the left and right wheel units 551-1 and 551-2 are the same (i.e., the two wheel units 551-1 and 551-2 are not independently steerable, and instead controlled by a single steering-actuator such that $K_1=1$), and equal to $\delta_1$ (thus reducing the number of elements in $u_1$ from eight to seven).

In order to find the efficiency matrix $B_i$ for a vehicle unit 510-*i*, the tire forces for the wheel units of the vehicle unit as function of applied torque must first be defined. In the coordinate frames of the respective wheel units, the j:th wheel unit of the i:th vehicle unit 510-I generates longitudinal and lateral tire forces $F_{x,i,j}$ and $F_{y,i,j}$, respectively, defined in their own wheel unit-fixed coordinate systems as shown in FIG. 5B. Using a linear tire model, and assuming small longitudinal and lateral slips $\kappa$ and $\alpha$, the longitudinal and lateral tire forces may be approximated as $$F_{x,i,j} = C_{x,i,j}\kappa$$

and $$F_{y,i,j} = -C_{\alpha,i,j}\alpha,$$

where $C_{x,i,j}$ and $C_{\alpha,i,j}$ is the longitudinal and cornering tire stiffness, respectively, of the j:th wheel unit of the i:th vehicle unit. If, for example, further assuming negligible rolling resistance and disregarding an inertia of a wheel unit, the generated longitudinal tire force $F_{x,i,j}$ can be further simplified as $$F_{x,i,j} = \frac{T_{i,j}}{R_{i,j}}, \tag{5a}$$

where $F_{x,i,j}$, $T_{i,j}$ and $R_{i,j}$ are the longitudinal tire force of, the torque applied to, and the effective rolling radius, respectively, of the j:th wheel unit of the i:th vehicle unit, and where the torque is the combined engine and braking torque applied to the wheel unit.

In order to translate the tire forces for each steerable wheel unit from its own, unit-fixed coordinate frames to the coordinate frame of the vehicle unit, the forces may be rotated by using the rotation matrix $$R(\delta_{i,j}) = \begin{bmatrix} \cos\delta_{i,j} & -\sin\delta_{i,j} \\ \sin\delta_{i,j} & \cos\delta_{i,j} \end{bmatrix}.$$

If, however, assuming that the steering angles $\delta_{i,j}$ are sufficiently small, the rotation matrix $R(\delta_{i,j}\approx 1)$ simplifies into a unit matrix, and it can thus be assumed that the wheel unit-fixed coordinate systems for steerable wheel units thus aligns with the coordinate system of the vehicle unit itself (i.e. the coordinate system of the unit-specific forces $F_{x,1}$, $F_{y,2}$ and yaw-moment $M_{z,1}$ as shown in FIG. 5B). Under such an assumption, the lateral tire force $F_{y,i,j}$ may be further simplified as $$F_{y,i,j} \approx C_{\alpha,i,j}\delta_{i,j}. \tag{5b}$$

The first slave control allocator 430-1 is now faced with the task of finding the true control input $u_i$ for its actuators based on $v_1=B_1u_1$. Using the assumptions made in equations (5a) and (5b), the efficiency matrix $B_1$ for the first vehicle unit 510-1 can be formulated such that $$\underbrace{\begin{bmatrix} F_{x,1} \\ F_{y,1} \\ M_{z,1} \end{bmatrix}}_{v_1} = \underbrace{\begin{bmatrix} \frac{1}{R_{1,1}} & \frac{1}{R_{1,2}} & \frac{1}{R_{1,3}} & \frac{1}{R_{1,4}} & \frac{1}{R_{1,5}} & \frac{1}{R_{1,6}} & 0 \\ 0 & 0 & 0 & 0 & 0 & 0 & 2C_{\alpha,1} \\ \frac{-w_1}{R_{1,1}} & \frac{w_1}{R_{1,2}} & \frac{-w_1}{R_{1,3}} & \frac{-w_1}{R_{1,4}} & \frac{-w_1}{R_{1,5}} & \frac{w_1}{R_{1,6}} & 2C_{\alpha,1}l_{f1} \end{bmatrix}}_{B_1} \underbrace{\begin{bmatrix} T_{1,1} \\ T_{1,2} \\ T_{1,3} \\ T_{1,4} \\ T_{1,5} \\ T_{1,6} \\ \delta_1 \end{bmatrix}}_{u_1},$$

where it has been assumed that the cornering stiffness of all wheel units of the first vehicle unit 510-1 are equal, such that $C_{\alpha,1,j}=C_{\alpha,1}$.

Based on the above definition of e.g. $B_1$, the first slave control allocator 430-1 may then proceed by solving its unit-specific control allocation problem as defined in equation (4), find the true control input $u_1$, and then control the actuators 312-1 based on torques and steering angles provided by $u_1$. It should be noted that the slave control unit 430-1 is only concerned with finding the correct true control input $u_1$ for its own actuators, and does not need to worry about how the other vehicle units and their associated slave control allocators perform. All information the slave control allocator 430-1 needs is provided in the unit-specific virtual control input $v_1$ it receives from the master control allocator 420.

Figures 5C, 6A, 6B, 6C, 6D:
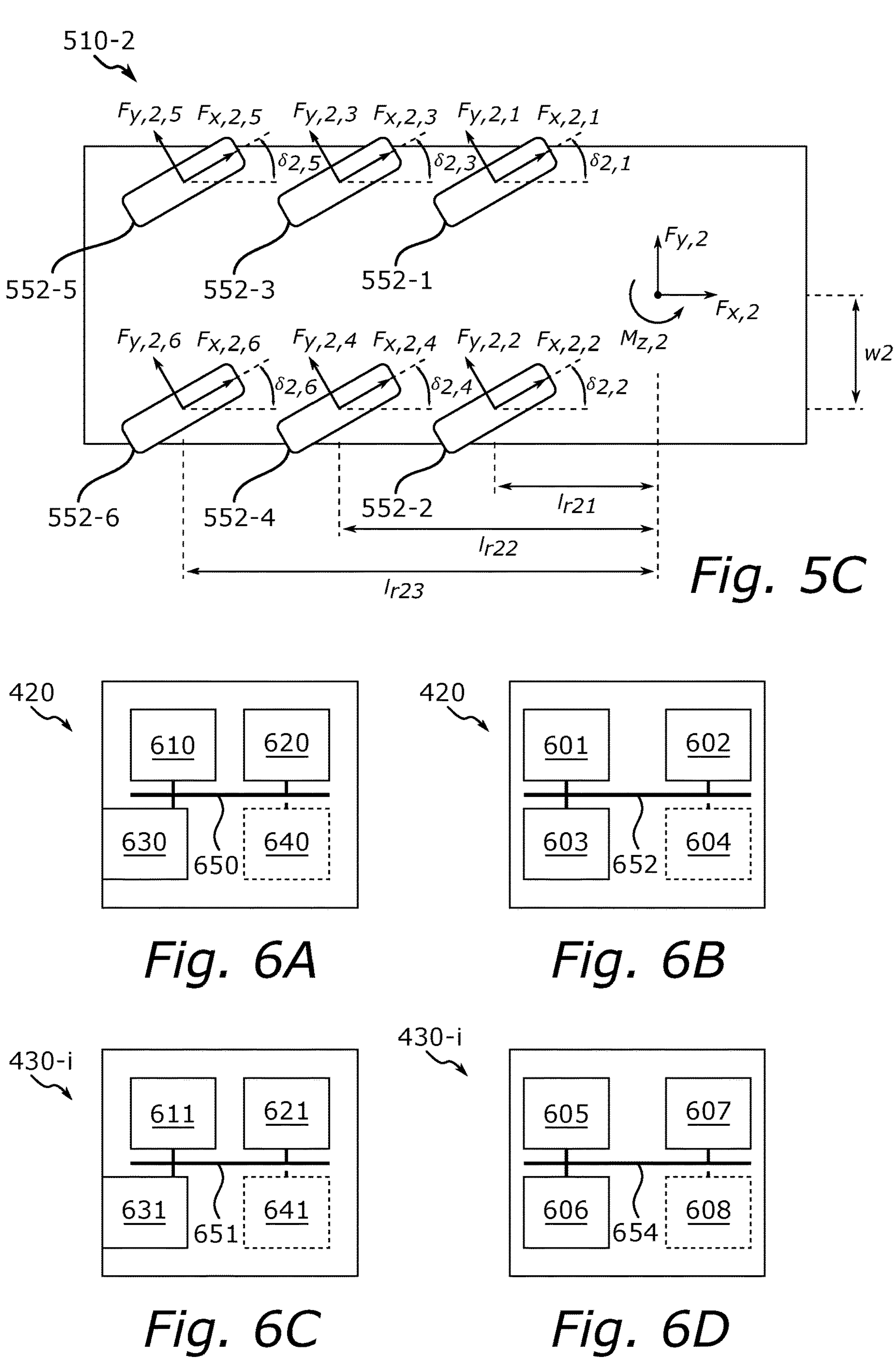
FIGS. 6A and 6B schematically illustrate various embodiments of a master control allocator according to the present disclosure, and FIGS. 6C and 6D schematically illustrate various embodiments of a slave control allocator according to the present disclosure.

FIG. 5C schematically illustrates a top-view of an example configuration of the second vehicle unit 510-2 and its wheel units and actuators. In this example, the second vehicle unit 510-2 includes a total of six wheel units 552-1 to 552-6, which are all steerable with respective steering angles $\delta_{2,1}$, . . . , $\delta_{2,6}$. The wheel units 552-1 to 552-6 are arranged such that first and second wheel units 552-1 and 552-2 form left and right wheel units of a first rear axle, such that third and fourth wheel units 552-3 and 552-4 form left and right wheel units of a second rear axle, and such that fifth and sixth wheel units 552-5 and 552-6 form left and right wheel units of a third rear axle. The first rear axle is located at a distance $l_{r21}$ rearward of the center-of-gravity 512-2, the second rear axle is located at a distance $l_{r22}$ rearward of the center-of-gravity 512-2, and the third rear axle is located at a distance $l_{r23}$ rearward of the center-of-gravity 512-2. The wheel units 552-1 to 552-6 are all located at a lateral distance $w_2$ to a longitudinal center axis (not shown) of the second vehicle unit 510-2. It is assumed that there are provided actuators such that all wheel units 552-1 to 552-6 may be individually driven and/or braked (i.e. such that $M_2=6$).

If further assuming that the steerable wheel units 552-1 to 552-6 are steered such that their steering angles $\delta_{2,j}$ are always equal, i.e. $\delta_{2,j}=\delta_2$, it may be assumed that there is only a single steering-actuator involved, such that $K_2=1$.

The unit-specific control allocation problem that needs to be solved by the second slave control allocator 430-2 is thus to, based on the unit-specific virtual control input $$v_2 = [F_{x,2}, F_{y,2}, M_{z,2}]^T$$

provided from the master control allocator 420, find $$u_2 = [T_{2,1}, T_{2,2}, T_{2,3}, T_{2,4}, T_{2,5}, T_{2,6}, \delta_2]^T,$$

where $T_{2,j}$ is the torque to be applied to the j:th wheel unit **552-*j* of the second vehicle unit 510-1**.

The longitudinal and lateral tire forces of the wheel units 552-1 to 552-6 are, in their respective wheel unit-fixed coordinate frames as shown in FIG. 5C, $F_{x,2,j}$ and $F_{y,2,j}$, respectively. The same assumptions as for the first vehicle unit 510-1 can be used, i.e. the same tire force approximations and the assumption that also $\delta_2$ is small such that the wheel unit-fixed coordinate systems align with the coordinate system of unit-specific forces $F_{x,2}$, $F_{y,2}$ and yaw moment $M_{z,2}$ (as shown in FIG. 5C). If so doing, the relation $v_2=B_2u_2$ (where $B_2$ is the efficiency matrix for the second vehicle unit 510-2), can be written as $$\underbrace{\begin{bmatrix} F_{x,2} \\ F_{y,2} \\ M_{z,2} \end{bmatrix}}_{v_2} =$$

-continued $$\begin{bmatrix} \frac{1}{R_{2,1}} & \frac{1}{R_{2,2}} & \frac{1}{R_{2,3}} & \frac{1}{R_{2,4}} & \frac{1}{R_{2,5}} & \frac{1}{R_{2,6}} & 0 \\ 0 & 0 & 0 & 0 & 0 & 0 & 6C_{\alpha,2} \\ \frac{-w_2}{R_{2,1}} & \frac{w_2}{R_{2,2}} & \frac{-w_2}{R_{2,3}} & \frac{w_2}{R_{2,4}} & \frac{-w_2}{R_{2,5}} & \frac{w_2}{R_{2,6}} & 2C_{\alpha,2}(l_{r21}+l_{r22}+l_{r23}) \end{bmatrix}_{B_2} \underbrace{\begin{bmatrix} T_{2,1} \\ T_{2,2} \\ T_{2,3} \\ T_{2,4} \\ T_{2,5} \\ T_{2,6} \\ \delta_2 \end{bmatrix}}_{u_2},$$

where it has been assumed that the cornering stiffness of all wheel units of the second vehicle unit 510-2 are also equal, such that $C_{\alpha,2,j}=C_{\alpha,2}$.

Based on the above definition of e.g. $B_2$, the second slave control allocator 430-2 may then proceed by solving its unit-specific control allocation problem as defined in equation (4), find the true control input $u_2$, and then control the actuators 312-2 based on torques and steering angles provided by $u_2$. It should be noted that just as for the first slave control allocator 430-1, the second slave control allocator 430-2 is not either concerned with the operations of any of the other slave control allocators and vehicle units, and receives all information from the master control allocator 420 via the unit-specific virtual control input $v_2$.

For example, it may be assumed that the first vehicle unit in a vehicle combination is e.g. the towing unit (such as a tractor or truck), and that the remaining vehicle units are all connected to this first vehicle unit in series. It can further be assumed that the i:th vehicle unit in such a vehicle combination forms an articulation angle $\theta_i$ with the next (i+1):th vehicle unit in the vehicle combination (except, of course, for the last, N:th, vehicle unit which is not towing any other vehicle unit). Under these assumptions, the desired relation between $u_{vc}$ and $u_{unit}$ can be written as $$\underbrace{\begin{bmatrix} F_{xtot} \\ F_{ytot} \\ M_{ztot,1} \\ M_{ztot,2} \\ \vdots \\ M_{ztot,N} \end{bmatrix}}_{v_{vc}} = \underbrace{\begin{bmatrix} I & B_{2,1}(\theta_1) & B_{3,1}(\theta_1,\theta_2) & \dots & B_{N,1}(\theta_1,\theta_2,\dots,\theta_{N-1}) \\ 0 & B_{2,2} & B_{2,3} & \dots & B_{N,2} \\ 0 & 0 & B_{3,3} & \dots & B_{N,3} \\ \vdots & \vdots & \vdots & \ddots & \vdots \\ 0 & 0 & 0 & 0 & B_{N,N} \end{bmatrix}}_{B_{vc}} \underbrace{\begin{bmatrix} F_{x,1} \\ F_{y,1} \\ M_{z,1} \\ \vdots \\ F_{x,N} \\ F_{y,N} \\ M_{z,N} \end{bmatrix}}_{u_{unit}},$$

where $B_{i,j}$ are functions coupling the i:th and j:th vehicle units together, and may be based on how the coupling points in the respective vehicle units are arranged, and similar.

As an example, for the two-unit example described earlier herein, the coupling functions are provided as $$\underbrace{\begin{bmatrix} F_{xtot} \\ F_{ytot} \\ M_{ztot,1} \\ M_{ztot,2} \end{bmatrix}}_{v_{vc}} = \underbrace{\begin{bmatrix} 1 & 0 & 0 & \cos\theta_1 & \sin\theta_1 & 0 \\ 0 & 1 & 0 & -\sin\theta_1 & \cos\theta_1 & 0 \\ 0 & 0 & 1 & d_{r1}\sin\theta_1 & -d_{r1}\cos\theta_1 & 0 \\ 0 & 0 & 0 & 0 & d_{f2} & 1 \end{bmatrix}}_{B_{vc}} \underbrace{\begin{bmatrix} F_{x,1} \\ F_{y,1} \\ M_{z,1} \\ F_{x,2} \\ F_{y,2} \\ M_{z,1} \end{bmatrix}}_{u_{unit}} = \begin{bmatrix} I & B_{2,1}(\theta_1) \\ 0 & B_{2,2} \end{bmatrix} \underbrace{\begin{bmatrix} F_{x,1} \\ F_{y,1} \\ M_{z,1} \\ F_{x,2} \\ F_{y,2} \\ M_{z,1} \end{bmatrix}}_{u_{unit}},$$

where I is a 3×3 unit-matrix, $B_{2,1}(\theta)$ is a 3×3 matrix, and $B_{2,2}$ is a 1×3 matrix/array.

With reference to FIGS. 6A to 6D, various embodiments of master control allocators and slave control allocators as envisaged herein will now be described in more detail.

It should further be noticed that for example the efficiency matrix $B_i$ for each vehicle unit is easily adjustable to other wheel unit and actuator configurations, following the same principles and reasonings as have been applied above when discussing the particular example shown in FIGS. 5A to 5C.

Likewise, for an arbitrary number of N vehicle units, the problem to be solved by the master control allocator 420 is easily adjusted to account for the exact amount of vehicle units and slave control allocators involved, and still without concern for the exact configuration of wheel units and actuators in each vehicle unit.

FIG. 6A schematically illustrates, in terms of a number of functional units, the components of an embodiment of a master control allocator 420 for a distributed control allocation system as envisaged and described earlier herein. The master control allocator 420 includes processing circuitry 610. The processing circuitry 610 is provided using any combination of one or more of a suitable central processing unit (CPU), multiprocessor, microcontroller, digital signal processor (DSP), etc., capable of executing software instructions stored in a computer program product (not shown, but envisaged herein) stored on a storage medium 620. The processing circuitry 610 may further be provided as at least one application specific integrated circuit (ASIC), or field-programmable gate array (FPGA), or similar.

Particularly, the processing circuitry 610 is configured to cause the master control allocator 420 to perform a set of operations, or steps, such as one or more of steps S403-S405 (and optionally also step S408)) as disclosed above e.g. when describing the methods 400 and/or 401 illustrated in FIGS. 4A and/or 4C. For example, the storage medium 620 may store a set of operations, and the processing circuitry 610 may be configured to retrieve the set of operations from the storage medium 620 to cause the master control allocator 420 to perform the set of operations. The set of operations may be provided as a set of executable instructions. Thus, the processing circuitry 610 is thereby arranged to execute methods as disclosed herein e.g. with reference to FIGS. 4A, 4B and 4C. In some embodiments, the master control allocator 420 may be slightly modified such that it first, before performing step S404, obtains information indicative of how many slave control allocators 430-*i* that are currently connected to the master control allocator 420. By so doing, when performing steps S404 and S405-1, the master control allocator 420 only needs to calculated and distributed the unit-specific virtual control inputs $v_i$ for/to the slave control allocators 430-*i* that are currently connected to the master control allocator 420.

The storage medium 620 may also include persistent storage, which, for example, can be any single or combination of magnetic memory, optical memory, solid state memory or even remotely mounted memory. The storage medium 620 may thus provide non-transitory storage, storing computer-readable instructions for the processing circuitry 610.

The master control allocator 420 may further include a communications interface 630 for communications with other entities and objects, in order to communicate with one or more slave control allocators as also envisaged herein, and/or e.g. to receive the signal 412 from the virtual control unit 410. The interface 630 may also be used to receive other information about the vehicle combination 300. The communication interface 630 may include one or more transmitters and receivers, including analogue and/or digital components, and may utilize e.g. one or more wired and/or wireless connections for this purpose.

The processing circuitry 610 controls the general operation of the master control allocator 420 e.g. by sending data and control signals to the communications interface 630 and the storage medium 620, by receiving data and reports from the communications interface 630, and by retrieving data and instructions from the storage medium 620. The master control allocator 420 may of course optionally also include other components, here illustrated by the dashed box 640. A communication bus 650 is also provided and connects the various modules/units 610, 620, 630, and 640 (if included), such that they may communicate with each other to exchange information.

FIG. 6B schematically illustrates, in terms of a number of functional modules 601-604, the components of a master control allocator 420 according to one or more embodiments of the present disclosure. The master control allocator 420 includes at least a first receive module 601 configured to perform step S403 of the method 400 or 401 described with reference to FIG. 4B or 4C, a control allocation module 602 configured to perform step S404 of the method 400 or 401, and a distribute/send module 603 configured to perform step S405-1 (as part of step S405) of the method 400 or 401. In some embodiments, the master control allocator 420 may also include a second receive module (illustrated by the dashed box 604) configured to perform step S408 of the method 401. As described above with reference to FIG. 6A, the steps S404 and S405-1 may be preceded by the master control allocator 420 first receiving information indicating how many slave control allocators 430-*i* that are currently connected to the master control allocator 420, such that the master control allocator 420 may limit its calculations/sending to only those slave control allocators 430-*i*.

In general terms, each functional module (such as modules 601-604) may be implemented in hardware or in software. Preferably, one or more or all functional modules may be implemented by the processing circuitry 610, possibly in cooperation with the communications interface 630 and/or the storage medium 620. The processing circuitry 610 may thus be arranged to from the storage medium 620 fetch instructions as provided by a functional module (e.g. 601-604), and to execute these instructions and thereby perform any steps of the method 400 (and/or the method 401), or any other method envisaged herein, performed by the master control allocator 420 as disclosed herein.

FIG. 6C schematically illustrates, also in terms of a number of functional units, the components of an embodiment of a slave control allocator 430-*i* for a distributed control allocation system as envisaged and described earlier herein. The slave control allocator 430-*i* includes, just as the master control allocator 420, processing circuitry 611, a storage medium 621, and a communications interface 631, as well as one or more optional components (illustrated by the dashed box 641). The general functionality/configuration of these components is the same as those of the master control allocator 420, and will therefore not be restated here again. The differences are e.g. that the processing circuitry 612, storage medium 621 and communications interface 631 are configured such that the slave control allocator 430-I performs e.g. steps S405-2 (as part of step S405), S406 and S407 of the method 400 or 402 described with reference to FIGS. 4B and 4D, or e.g., in addition, one or more of the steps S409, S410 and S411 of the method 401 described with reference to FIG. 4D. Thus, the slave control allocator is configured to execute methods as shown in FIGS. 4A, 4B and/or 4D herein. The communications interface 631 may, in the slave control allocator 430-*i*, instead be configured to allow the slave control allocator to communicate with e.g. a master slave controller of the distributed control allocation system, and/or with the one or more actuators of the vehicle unit with which the slave control allocator 430-*i* is or can be associated.

FIG. 6D schematically illustrates, in terms of a number of functional modules 605-608, the components of a slave control allocator 430-*i* according to one or more embodiments of the present disclosure. The slave control allocator 430-*i* includes at least a first receive module 605 configured to perform step S405-2 (as part of step S405) of the method 400 or 402 described with reference to FIG. 4B or 4D, a control allocation module 606 configured to perform step S406 of the method 400 or 402, and a control module 607 configured to perform step S407 of the method 400 or 402. In some embodiments, the slave control allocator 430-*i* may also include one or more additional modules (jointly illustrated by the dashed box 608) configured to perform e.g. step S409 and possibly also steps S410 and S411 of the method 402. Other details of the various modules 405-408 may be the same as for the modules 401-404 of the master control allocator 420, and will not be restated here again. In some embodiments, the slave control allocator 430-*i* may be adjusted such that it, before performing steps S406 and S407, first obtains information indicative of how many actuators 312-*i* that are currently connected to the slave control allocator 430-*i*. By so doing, the steps S406 and S407 may be performed such that the unit-specific true control input $u_i$ is only calculated for the currently connected actuators 312-*i*, and such that step S407 only includes controlling the currently connected actuators 312-*i*. Similarly, if performing step S409, actuator-limitations $\underline{\overline{u}}$_i may be received only from the currently connected actuators 312-*i*, such that e.g. only these actuator-limitations are used as input to the unit-specific control allocation problem. Likewise, if performing step S410, only the actuator-limitations of the currently connected actuators 312-*i* may be taken into account when calculating the unit-specific force- and/or moment-limitations $\underline{\overline{u}}_{unit,i}$.

The present disclosure also envisages to provide a distributed control allocation system, such as e.g. the system 490 illustrated and described with reference to FIG. 4A, for a vehicle combination including a plurality of vehicle units (such as the vehicle combination 300 described herein with reference to FIG. 3). The system includes a master control allocator (such as 420) and a plurality of slave control allocators (such as 430-1 to 430-N), wherein the master control allocator is communicatively connectable to the various slave control allocators 430-I, and where each slave control allocator 430-*i* can be associated with, and assigned the task of controlling the various actuators 312-*i* of, a respective vehicle unit 310-*i*. Preferably, when forming part of the distributed control allocation system, the master and slave control allocators are configured such that the master control allocator obtains information about currently connected slave control allocators and takes only those into account when calculating the unit-specific virtual control inputs, and such that each slave control allocator obtains information about currently connected actuators and takes only those into account when controlling the actuators, and/or when receiving actuator-limitations and possibly calculating the unit-specific force- and/or moment-limitations sent to the master control allocator.

The present disclosure also envisages to provide a vehicle combination, such as for example the vehicle combination 300 described earlier herein with reference to FIG. 3. The vehicle combination 300 may include a distributed control allocation system as described above (such as the system 490). The master control allocator may be communicatively connected to each of the slave control allocators (such as the slave control allocators 430-*i*), and each slave control allocator may be associated with a particular vehicle unit of the vehicle combination and communicatively connected to the actuators of the associated vehicle unit.

The present disclosure also envisages to provide a vehicle unit, such as e.g. the vehicle unit 310-*i* of the vehicle combination 300. Such a vehicle unit may include at least one of a master control allocator and a slave control allocator, such as e.g. the master control allocator 420 and/or the slave control allocator 430-*i* described with reference to e.g. FIGS. 4A-4D and/or FIGS. 6A-6D.

The present disclosure also envisages to provide computer programs (not shown) for a master control allocator and computer programs for a slave allocator, as envisaged herein. The computer programs includes computer code that, when running on a processing circuitry of e.g. the master control allocator or the slave control allocator (such as e.g. the processing circuitry 610 of the master control allocator 420 described with reference to FIGS. 6A and 6B, or e.g. the processing circuitry 612 of the slave control allocator 430-*i* described with reference to FIGS. 6C and 6D), causes the respective control allocator to perform the various steps of any method (such as e.g. method 401 for the master control allocator, or the method 402 for the slave control allocator) as described and envisaged herein.

The present disclosure also envisages to computer program products (not shown) in which the one or both of the above envisaged computer programs are stored or distributed on a data carrier. For example, a computer program may include the computer program for the master control allocator, the computer program for the slave control allocator, or even the computer programs for both the master control allocator and the slave control allocator. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Although features and elements may be described above in particular combinations, each feature or element may be used alone without the other features and elements or in various combinations with or without other features and elements. Additionally, variations to the disclosed embodiments may be understood and effected by the skilled person in practicing the claimed invention, from a study of the drawings, the disclosure, and the appended claims. For all methods disclosed herein and described herein, the order of these steps may not necessarily be as illustrated in the corresponding Figures. To the contrary, if not explicitly stated otherwise, the order of the steps of any method disclosed herein may be changed while still maintaining the intended functionality of the method.

In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

In summary of the present disclosure, it is provided an improved way of performing control allocation in a multi-unit vehicle combination, wherein a distributed control allocation system uses a master control allocator for control allocation on a vehicle combination level, and one or more slave control allocators for control allocation on vehicle unit level. As each slave control allocator is responsible only for controlling its own associated actuators and vehicle unit, the slave control allocators may operate independently of each other. Likewise, the master control allocator can be constructed in a more generic way and does not need to take into account the exact configuration of each connected vehicle unit. Instead, the master control allocator only needs to consider how many vehicle units and slave control allocators that are currently connected, and may receive e.g. unit-specific force- and/or moment-limitations for each vehicle unit in order to adaptively thereto solve its combination-specific control allocation problem and distribute the solutions to each respective slave control allocator and vehicle unit. This makes the master control allocator more versatile, as it does not need to be re-developed each time the configuration of the vehicle combination changes, or each time a configuration of a vehicle unit changes.

The invention claimed is:

1. A method of distributed control allocation in a vehicle combination including a plurality of vehicle units, each vehicle unit including one or more wheel units and one or more actuators configured to provide at least one of torque and steering for the one or more wheel units, the method being performed by processing circuitry of a master control allocator associated with the vehicle combination as a whole and of a plurality of slave control allocators each associated with a respective vehicle unit of the vehicle combination, comprising:

receiving at least one of requested global forces and requested global moments for the vehicle combination as a whole;

in the master control allocator:

receiving at least one of vehicle unit-specific force-limitations and vehicle unit-specific moment-limitations of the vehicle units; and calculating vehicle unit-specific desired forces for each vehicle unit by solving a vehicle combination-specific control allocation problem, wherein solving the vehicle combination-specific control problem includes attempting to distribute the requested global forces for the vehicle combination as a whole among the vehicle units in accordance with a vehicle combination-specific control efficiency matrix and subject to at least one of the received vehicle unit-specific force-limitations and the received vehicle unit-specific moment-limitations, and wherein the vehicle combination-specific control efficiency matrix is defined based on one or more articulation angles between the vehicle units and an arrangement of coupling points in the vehicle units; and in each of the plurality of slave control allocators:

receiving the vehicle unit-specific desired forces for the vehicle unit;

calculating a vehicle unit-specific control input for the vehicle unit based on the vehicle unit-specific desired forces for the vehicle unit by solving a vehicle unit-specific control allocation problem; and controlling the one or more actuators of the vehicle unit associated with the slave control allocator based on the calculated vehicle unit-specific control input.

2. The method of claim 1, wherein the method further includes each slave control allocator receiving actuator-limitations of the one or more actuators of the vehicle unit associated with the slave control allocator, and each slave control allocator using the received actuator-limitations as input to the vehicle unit-specific control allocation problem.

3. The method claim 2, wherein the method further includes each slave control allocator calculating the at least one of the vehicle unit-specific force-limitations and the vehicle unit-specific moment-limitations of the vehicle unit based on the received actuator-limitations of the one or more actuators of the vehicle unit, and the master control allocator receiving the at least one of the vehicle unit-specific force-limitations and the vehicle unit-specific moment-limitations for the vehicle units from the slave control allocators.

4. The method of claim 2, wherein the actuator-limitations include limitations on at least one of torque and steering providable by the one or more actuators.

5. The method of claim 1, wherein the one or more actuators include at least one of an electric machine, a service brake, and a steering servo arrangement.

6. A distributed control allocation system for a vehicle combination including a plurality of vehicle units, each vehicle unit including one or more wheel units and one or more actuators configured to provide at least one of torque and steering for the one or more wheel units, the system comprising:

a master control allocator; and a plurality of slave control allocators each communicatively connectable to the master control allocator and to the one or more actuators of a respective one of the vehicle units;

wherein the master control allocator and plurality of slave control allocators comprise processing circuitry configured to cause the distributed control allocation system to perform the method of claim 1.

7. The system of claim 6, wherein the processing circuitry of each slave control allocator is further configured to:

receive actuator-limitations of the one or more actuators connected to the slave control allocator; and calculate the at least one of vehicle unit-specific force-limitations and vehicle unit-specific moment-limitations for the vehicle unit based on the received actuator-limitations of the one or more actuators connected to the slave control allocator, and send the calculated at least one of vehicle unit-specific force-limitations and vehicle unit-specific moment-limitations to the master control allocator.

8. The system of claim 6, wherein the actuator-limitations include limitations on at least one of torque and steering providable by the one or more actuators.

9. A vehicle combination, comprising:

a plurality of coupled vehicle units, each vehicle unit including one or more wheel units and one or more actuators configured to provide at least one of torque and steering for the one or more wheel units; and the distributed control allocation system of claim 6, wherein the master control allocator is communicatively connected to each of the slave control allocators, and wherein each slave control allocator is associated with a respective vehicle unit and communicatively connected to the one or more actuators of the vehicle unit.

10. The vehicle combination of claim 9, wherein the one or more actuators of each vehicle unit include at least one of an electric machine, a service brake, and a steering servo arrangement.

11. A method performed in a master control allocator of a distributed control allocation system of a vehicle combination including a plurality of vehicle units, each vehicle unit including one or more wheel units and one or more actuators configured to provide at least one of torque and steering for the one or more wheel units, the master control allocator being communicatively connected to a plurality of slave control allocators each associated with a respective vehicle unit, the method being performed by processing circuitry of the master control allocator and comprising:

receiving requested global forces for the vehicle combination as a whole;

receiving at least one of vehicle unit-specific force-limitations and vehicle unit-specific moment-limitations of the vehicle units;

calculating vehicle unit-specific desired forces for each slave control allocator currently connected to the master control allocator, by solving a vehicle combination-specific control allocation problem, wherein solving the vehicle combination-specific control problem includes attempting to distribute the requested global forces for the vehicle combination as a whole among the vehicle units in accordance with a vehicle combination-specific control efficiency matrix and subject to at least one of the received vehicle unit-specific force-limitations and the received vehicle unit-specific and moment-limitations, and wherein the vehicle combination-specific control efficiency matrix is defined based on one or more articulation angles between the vehicle units and an arrangement of coupling points in the vehicle units; and sending the calculated vehicle unit-specific desired forces to the respective one or more slave control allocators connected to the master control allocator.

12. The method of claim 11, wherein the method further includes receiving the at least one of the force-limitations and moment-limitations of the vehicle units from the one or more slave control allocators connected to the master control allocator.

13. A master control allocator for a distributed control allocation system for a vehicle combination including a plurality of vehicle units, each vehicle unit including one or more wheel units and one or more actuators configured to provide at least one of torque and steering for the one or more wheel units, the master control allocator being communicatively connectable to a plurality of slave control allocators of the distributed control allocation system, and comprising processing circuitry configured to cause the master control allocator to perform the method of claim 11.

14. A vehicle unit, comprising the master control allocator of claim 13.

15. A vehicle unit, comprising the slave control allocator of claim 13.

16. A non-transitory computer-readable storage medium comprising instructions which, when executed by processing circuitry of the master control allocator, cause the processing circuitry to cause the master control allocator to perform the method of claim 11.

17. A method performed in a slave control allocator of a distributed control allocation system of a vehicle combination including a vehicle unit, the vehicle unit including one or more wheel units and one or more actuators configured to provide at least one of torque and steering for the one or more wheel units, the slave control allocator being associated with the vehicle unit and communicatively connected to a master control allocator of the distributed control allocation system and to the one or more actuators, the method being performed by processing circuitry of the slave control allocator and comprising:

receiving vehicle unit-specific desired forces for the vehicle unit from the master control allocator;

receiving actuator-limitations of the one or more actuators;

calculating at least one of vehicle unit-specific force-limitations and vehicle unit-specific moment-limitations for the vehicle unit based on the received actuator-limitations of the one or more actuators, and sending the calculated at least one of vehicle unit-specific force-limitations and vehicle unit-specific moment-limitations to the master control allocator;

calculating a vehicle unit-specific control input for the vehicle unit based on the vehicle unit-specific desired forces, by solving, subject to at least the received actuator-limitations of the one or more actuators, a vehicle unit-specific control allocation problem; and controlling the one or more actuators connected to the slave control allocator based on the calculated vehicle-specific control input.

18. The method of claim 17, wherein the actuator-limitations include limitations on at least one of torque and steering providable by the one or more actuators.

19. A slave control allocator for a distributed control allocation system for a vehicle combination including a vehicle unit, the vehicle unit including one or more wheel units and one or more actuators configured to provide at least one of torque and steering for the one or more wheel units, the slave control allocator being communicatively connectable to a master control allocator of the distributed control allocation system and to the one or more actuators of the vehicle unit, and comprising second processing circuitry configured to cause the slave control allocator to perform the method of claim 17.

20. A non-transitory computer-readable storage medium comprising instructions which, when executed by processing circuitry of the slave control allocator, cause the processing circuitry to cause the slave control allocator to perform the method of claim 17.

* * * * *